(12) United States Patent
Chernov et al.

(10) Patent No.: US 10,360,718 B2
(45) Date of Patent: Jul. 23, 2019

(54) METHOD AND APPARATUS FOR CONSTRUCTING THREE DIMENSIONAL MODEL OF OBJECT

(71) Applicant: Samsung Electronics Co., Ltd., Suwon-si, Gyeonggi-do (KR)

(72) Inventors: Vitaly Vladimirovich Chernov, Moscow (RU); Artem Gennadievich Shamsuarov, Moscow (RU); Oleg Fanilevich Muratov, Moscow (RU); Yury Vyacheslavovich Slynko, Moscow Region (RU); Maria Mikhailovna Lyubimtseva, Moscow (RU); Victor Valentinovich Bucha, Moscow (RU)

(73) Assignee: Samsung Electronics Co., Ltd., Suwon-si (KR)

(*) Notice: Subject to any disclaimer, the term of this patent is extended or adjusted under 35 U.S.C. 154(b) by 51 days.

(21) Appl. No.: 15/206,918

(22) Filed: Jul. 11, 2016

(65) Prior Publication Data
US 2017/0046868 A1    Feb. 16, 2017

(30) Foreign Application Priority Data

Aug. 14, 2015  (RU) .............................. 2015134345
May 13, 2016  (KR) ........................ 10-2016-0058779

(51) Int. Cl.
*G06T 17/00*  (2006.01)
*G06T 15/04*  (2011.01)
(Continued)

(52) U.S. Cl.
CPC .............. *G06T 15/04* (2013.01); *G06T 7/246* (2017.01); *G06T 7/579* (2017.01); *G06T 17/20* (2013.01);
(Continued)

(58) Field of Classification Search
None
See application file for complete search history.

(56) References Cited

U.S. PATENT DOCUMENTS 6,405,151 B1    6/2002  Fujii et al.
6,891,978 B1*   5/2005  Takano .................. G06T 11/60
                                                382/284
(Continued)

FOREIGN PATENT DOCUMENTS

EP          0 895 192 A2     2/1999
KR   10-2009-0119442 A      11/2009
(Continued)

OTHER PUBLICATIONS

Wagner et al., Real-Time Panoramic Mapping and Tracking on Mobile Phones, Mar. 2010, IEEE Virtual Reality Conference, pp. 211-218.*

(Continued)

*Primary Examiner* — Anh-Tuan V Nguyen
(74) *Attorney, Agent, or Firm* — Jefferson IP Law, LLP

(57) ABSTRACT

A method and an apparatus for constructing a three-dimensional (3D) model of an object are provided. The method includes capturing images of the object by scanning the object along a trajectory around the object, estimating positions of a scanner, which respectively correspond to the captured images, refining the estimated positions of the scanner based on at least two locations on the trajectory, estimating depth maps corresponding to the refined positions of the scanner, generating a surface mesh of the object by fusing the depth maps, and constructing and displaying the 3D model of the object by mapping textures onto the generated surface mesh.

22 Claims, 21 Drawing Sheets
(1 of 21 Drawing Sheet(s) Filed in Color)

(51) Int. Cl.
  *G06T 7/579* (2017.01)
  *G06T 7/246* (2017.01)
  *G06T 17/20* (2006.01)
  *H04N 13/221* (2018.01)
  *H04N 13/00* (2018.01)

(52) U.S. Cl.
  CPC ......... *G06T 17/205* (2013.01); *H04N 13/221* (2018.05); *G06T 2200/08* (2013.01); *G06T 2207/20016* (2013.01); *G06T 2207/30241* (2013.01); *G06T 2207/30244* (2013.01); *H04N 2013/0081* (2013.01)

(56) References Cited

U.S. PATENT DOCUMENTS

| | | | |
|---|---|---|---|
| 8,270,704 B2 | 9/2012 | Kim et al. | |
| 8,532,367 B2* | 9/2013 | Kaganovich | G06T 7/579 345/169 |
| 8,587,583 B2 | 11/2013 | Newcombe et al. | |
| 8,705,893 B1* | 4/2014 | Zhang | G06K 9/00201 345/418 |
| 9,552,648 B1* | 1/2017 | Zhang | G06K 9/00771 |
| 2003/0185435 A1 | 10/2003 | Imai | |
| 2004/0027347 A1* | 2/2004 | Farsaie | G06T 17/20 345/419 |
| 2005/0058337 A1* | 3/2005 | Fujimura | G06K 9/00201 382/159 |
| 2005/0238200 A1* | 10/2005 | Gupta | G06K 9/00201 382/103 |
| 2006/0050952 A1* | 3/2006 | Blais | G01S 17/89 382/154 |
| 2006/0221187 A1* | 10/2006 | Alhadef | G01S 5/0027 348/207.1 |
| 2007/0064099 A1* | 3/2007 | Balter | G06T 9/00 348/51 |
| 2007/0065099 A1* | 3/2007 | Onishi | G11B 27/105 386/243 |
| 2007/0122001 A1* | 5/2007 | Wang | G06K 9/00208 382/103 |
| 2008/0205791 A1* | 8/2008 | Ideses | H04N 13/026 382/285 |
| 2009/0154794 A1 | 6/2009 | Kim et al. | |
| 2010/0045665 A1* | 2/2010 | Lefevre | G06T 7/20 345/419 |
| 2010/0054579 A1 | 3/2010 | Okutomi et al. | |
| 2010/0280699 A1* | 11/2010 | Bageshwar | G05D 1/0231 701/26 |
| 2011/0040425 A1* | 2/2011 | Tink | G01C 21/06 701/2 |
| 2011/0069152 A1* | 3/2011 | Wang | H04N 13/026 348/43 |
| 2011/0320153 A1* | 12/2011 | Lightcap | A61B 34/20 702/94 |
| 2012/0069019 A1* | 3/2012 | Richards | G06T 7/536 345/421 |
| 2012/0121161 A1* | 5/2012 | Eade | G09B 29/007 382/153 |
| 2012/0194516 A1 | 8/2012 | Newcombe et al. | |
| 2012/0257016 A1* | 10/2012 | Nakajima | G06T 17/20 348/46 |
| 2012/0306847 A1 | 12/2012 | Lim et al. | |
| 2012/0320032 A1 | 12/2012 | Zhu et al. | |
| 2013/0022233 A1* | 1/2013 | Ma | G01S 5/16 382/103 |
| 2013/0076915 A1* | 3/2013 | Ramachandran | G06T 7/2066 348/207.1 |
| 2013/0162785 A1* | 6/2013 | Michot | G06K 9/6289 348/50 |
| 2013/0182947 A1* | 7/2013 | Wang | G06T 7/0042 382/159 |
| 2013/0201291 A1* | 8/2013 | Liu | G06F 3/012 348/47 |
| 2013/0250062 A1* | 9/2013 | Tin | H04N 13/0018 348/46 |
| 2014/0062881 A1* | 3/2014 | Solomon | G09G 5/006 345/158 |
| 2014/0105486 A1* | 4/2014 | Tamaazousti | G06T 7/0044 382/154 |
| 2014/0160320 A1* | 6/2014 | Babale | H04N 5/23229 348/239 |
| 2014/0168212 A1* | 6/2014 | Jones | G06T 17/00 345/420 |
| 2014/0168268 A1* | 6/2014 | Oi | G06T 19/006 345/633 |
| 2014/0293016 A1* | 10/2014 | Benhimane | G06T 17/00 348/50 |
| 2014/0320661 A1* | 10/2014 | Sankar | H04N 7/183 348/158 |
| 2014/0355891 A1 | 12/2014 | Reif et al. | |
| 2014/0368504 A1* | 12/2014 | Chen | G06T 17/005 345/424 |
| 2015/0178988 A1* | 6/2015 | Montserrat Mora | G06T 13/40 345/420 |
| 2015/0193909 A1* | 7/2015 | Maayan | G06T 3/40 345/648 |
| 2015/0201180 A1* | 7/2015 | Mourikis | H04N 13/0203 348/46 |
| 2015/0304634 A1* | 10/2015 | Karvounis | H04N 13/0239 348/46 |
| 2015/0381968 A1* | 12/2015 | Arora | G06T 17/00 348/47 |
| 2016/0035139 A1* | 2/2016 | Fuchs | G02B 27/017 345/633 |
| 2016/0071278 A1* | 3/2016 | Leonard | G06T 7/0071 348/47 |
| 2016/0163098 A1* | 6/2016 | Blanchflower | G06T 15/50 345/419 |
| 2016/0284123 A1* | 9/2016 | Hare | G06T 7/55 |
| 2016/0306924 A1* | 10/2016 | Singh | G06F 19/321 |
| 2016/0317122 A1* | 11/2016 | dos Santos Mendonca | A61B 8/467 |
| 2017/0039765 A1* | 2/2017 | Zhou | G06T 19/006 |
| 2018/0012105 A1* | 1/2018 | Fan | G06K 9/4671 |

FOREIGN PATENT DOCUMENTS

| | | |
|---|---|---|
| RU | 2 295 772 C1 | 3/2007 |
| WO | 2014/202258 A1 | 12/2014 |

OTHER PUBLICATIONS

Repko et al., 3D Models from Extended Uncalibrated Video Sequences: Addressing Key-frame Selection and Projective Drift, IEEE Proceeding of the Fifth International Conference on 3D Digital Imaging and Modeling, pp. 150-157 (Year: 2005).*

Pollefeys et al., Detailed Real-Time Urban 3D Reconstruction from Video, Int. J Comput Vis 2008, 78: 143-167, Oct. 20, 2007.

* cited by examiner

METHOD AND APPARATUS FOR CONSTRUCTING THREE DIMENSIONAL MODEL OF OBJECT

CROSS-REFERENCE TO RELATED APPLICATION(S)

This application claims the benefit under 35 U.S.C. § 119(a) of a Russian patent application filed on Aug. 14, 2015 in the Federal Service for Intellectual Property (Rospatent) and assigned Serial number 2015134345, and of a Korean patent application filed on May 13, 2016 in the Korean Intellectual Property Office and assigned Serial number 10-2016-0058779, the entire disclosure of each of which is hereby incorporated by reference.

TECHNICAL FIELD

The present disclosure relates to image processing. More particularly, the present disclosure relates to a method and apparatus for constructing a three-dimensional (3D) model of an object by using images generated by scanning the object in 360°.

BACKGROUND

Three-dimensional (3D) reconstruction is a process of computing mathematical representation of a 3D surface of an object from two-dimensional (2D) projections of the object obtained from different points of view.

Generally, the 3D reconstruction is based on various optical systems used for image capturing. The optical system may be configured either as a depth camera (for example, an active depth sensor or stereo camera), or as a monocular camera.

The depth camera may capture depth maps of an object or environment in real time. Here, the depth maps may be captured immediately in case of the active depth sensor or after processing a pair of rectified stereo images in case of the stereo camera. Each pixel in the depth maps corresponds to a distance from one point of the object to the depth camera. However, when the depth camera is included in a device to capture the depth maps, many hardware resources related to a depth sensor is required, and thus hardware configuration of the device may be complex.

A silhouette-based 3D reconstruction approach may use monocular camera-based approaches. In the silhouette-based 3D reconstruction approach, silhouettes of an image are extracted and then a volume structure of the object is formed. According to the silhouette-based 3D reconstruction approach, a polygonal mesh with color texture is generated. However, in the silhouette-based 3D reconstruction approach, complicated computations related to extraction of silhouettes and fusion of volume data need to be performed in a device having low processing capability, such as a mobile device. Also, in the silhouette-based 3D reconstruction approach, concavities that are not seen in silhouette images are unable to be recovered.

An example of a method using monocular camera-based hardware includes a structure-from-motion (SfM)-based 3D reconstruction process. In the SfM-based 3D reconstruction process, trajectories of extracted feature points are used to reconstruct camera motion and 3D positions of an object. However, in the SfM-based 3D reconstruction process, since a 3D point cloud or polygonal mesh is reconstructed without texture, visual appearance of a reconstructed 3D model is not sufficient. Also, in the SfM-based 3D reconstruction process, since a large number of feature points need to be processed in order to increase accuracy, computational workloads may increase.

Since the 3D reconstruction approaches described above require many complex computations, it may be infeasible to implement the 3D reconstruction approaches on mobile platforms having limited process performances, such as a smart phones or tablets. Cloud-based data processing may be used to overcome the limited process performances of the mobile platforms, but in this case, the mobile platforms need to be network accessible all the time and may be time consuming compared to the 3D reconstruction approaches described above.

Thus, there is a need for techniques of 3D reconstruction of an object, which may be performed by using less time and suitable computational workloads, and also without use of additional hardware resources.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for constructing a three-dimensional (3D) model of an object.

Another aspect of the present disclosure is to provide non-transitory computer-readable recording media having recorded thereon programs, which when executed by a computer, perform the methods.

In accordance with an aspect of the present disclosure, a method of constructing a 3D model of an object is provided. The method includes capturing images of the object by scanning the object along a trajectory around the object, estimating positions of a scanner, which respectively correspond to the captured images, refining the estimated positions of the scanner based on at least two locations on the trajectory, estimating depth maps corresponding to the refined positions of the scanner, generating a surface mesh of the object by fusing the estimated depth maps, and constructing and displaying the 3D model of the object by mapping textures onto the generated surface mesh.

In accordance with another aspect of the present disclosure, an apparatus for configuring a 3D model of an object is provided. The apparatus includes a scanner configured to capture images of the object by scanning the object along a trajectory around the object, at least one processor configured to estimate positions of the scanner, which respectively correspond to the captured images, refine the estimated positions of the scanner based on at least two locations on the trajectory, estimate depth maps corresponding to the refined locations of the scanner, generate a surface mesh of the object by fusing the estimated depth maps, and construct the 3D model of the object by mapping textures onto the generated surface mesh, and a display configured to display the 3D mode of the object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
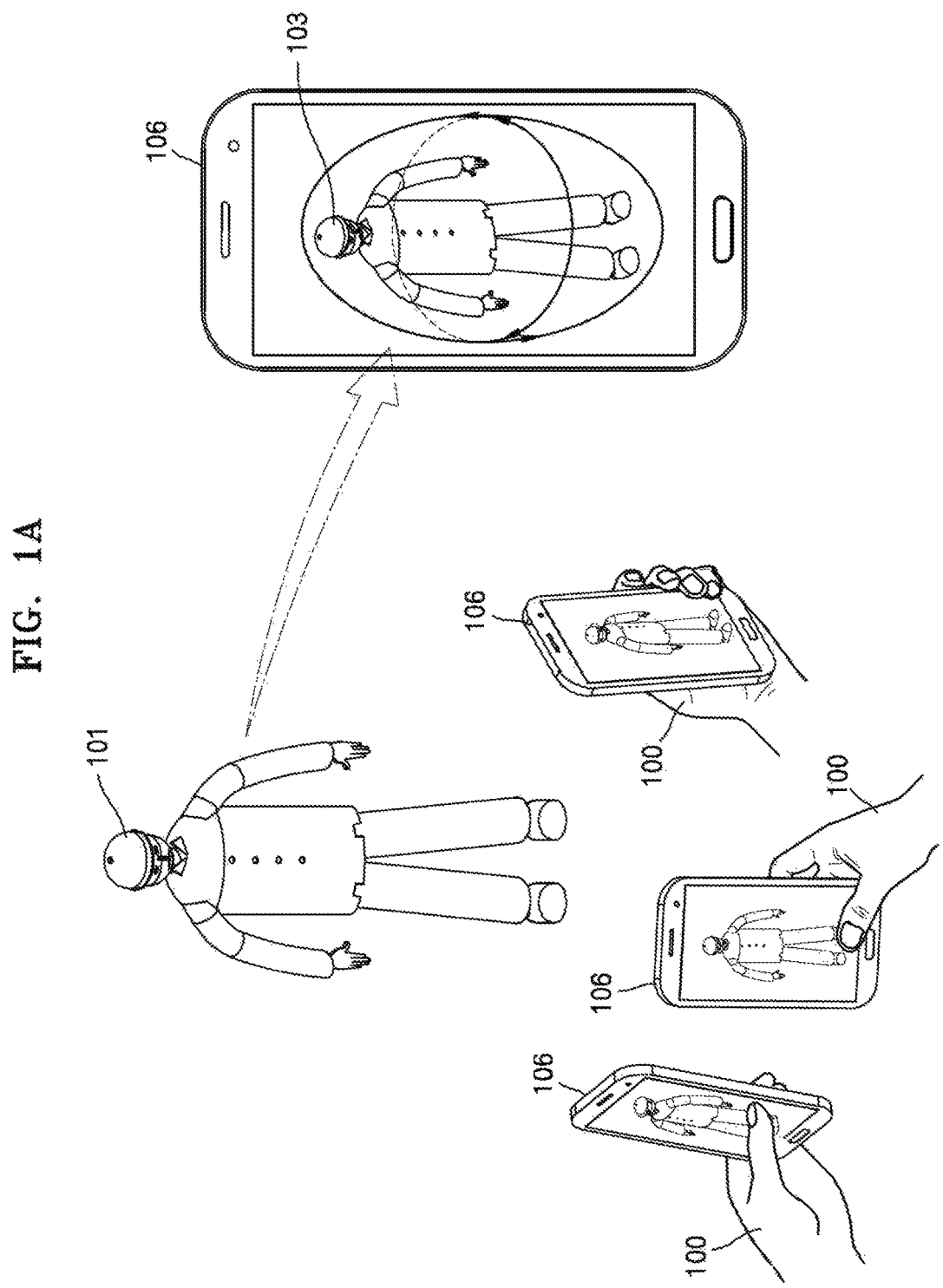
FIG. 1A is a diagram for describing a three-dimensional (3D) model of an object displayed on a device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

The terms "includes" or "comprises" used herein should not be construed as necessarily including several components or several operations described in the specification, and some components or some operations may not be included or additional components or additional operations may be further included.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

FIG. 1A is a diagram for describing a three-dimensional (3D) model 103 of an object 101 displayed on a device 106, according to an embodiment of the present disclosure.

Referring to FIG. 1A, a user 100 captures appearance images of the object 101 having a shape of a dummy by using the device 106, so as to reconstruct the 3D model 103 of the object 101. A scanning module (for example, a camera) of the device 106 obtains images of the object 101 while the user 100 moves around the object 101 and holds the scanning module (the camera) of the device 106 to face the object 101.

The device 106 extracts object data from the images by using an internal processor, such as a central processing unit (CPU) or a graphics processing unit (GPU), and generates the 3D model 103 by performing a reconstruction process on the object data. Similarly to the object 101, the 3D model 103 may be reconstructed to a representation of a texturized mesh. Meanwhile, in one or more embodiments, the term "reconstruction" means that an actual object is processed to a virtual 3D model or texturized mesh displayable on a display screen, and may be replaced by a similar term, such as "generation" or "construction" of a 3D model or texturized mesh.

The 3D model 103 is displayed on a display screen of the device 106. The user 100 may turn the 3D model 103 around by touching the display screen to check the 3D model 103 of the object 101.

Figure 1B:
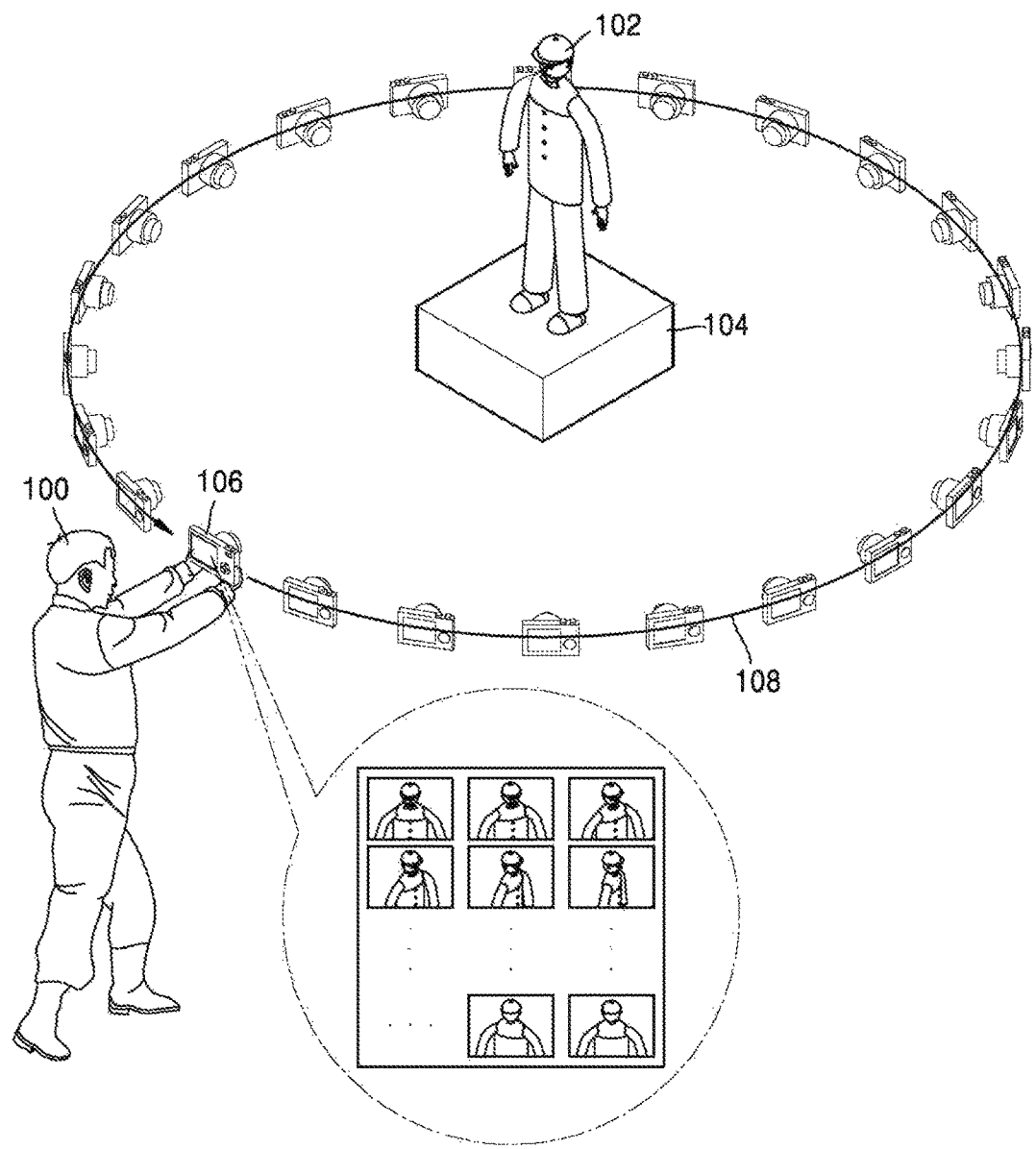
FIG. 1B is a diagram for describing scanning of an object by using a device for 3D reconstruction according to an embodiment of the present disclosure.

FIG. 1B is a diagram for describing scanning of an object 102 by using a device 106 for 3D reconstruction according to an embodiment of the present disclosure.

Referring to FIG. 1B, it is assumed that the user 100 of the device 106 is reconstructing a 3D model of the object 102 having a shape of a dummy Processes for 3D reconstruction begin by scanning the object 102 using the scanning module of the device 106. The scanning module may correspond to a camera included in the device 106 that is hand-held, such as a mobile phone or a tablet. The scanning module may be a monocular camera, a multi-view stereo camera, a depth sensor, or a combination thereof, but a type of the scanning module is not limited thereto.

For convenience of scanning, the object 102 may be placed on a pedestal 104. While scanning the object 102, the scanning module of the device 106 may always face the object 102. At this time, the user 100 moves along a trajectory 108 while holding the scanning module of the device 106 to face the object 102. In FIG. 1B, although the trajectory 108 is shown to be a circular trajectory in a counterclockwise direction, but the trajectory 108 is not limited thereto and may vary. For example, the trajectory 108 may have a closed loop or an opened loop. Alternatively, the trajectory 108 may have a circular shape or another arbitrary shape. While scanning the object 102, the user 100 may form the trajectory 108 by moving clockwise, counterclockwise, or both clockwise and counterclockwise.

After scanning the object 102 is finished, the user 100 stops capturing images of the object 102. In other words, the device 106 stops scanning the object 102 after the user 100 went around the trajectory 108. Once the capturing of the images is completed, the device 106 executes software for processing the captured images to perform a post-processing stage. A result of performing the post-processing stage is a texturized mesh, and may be the 3D model of the object 102. Operations performed during the post-processing stage will be described in detail later. Finally, the texturized mesh (i.e., a reconstructed 3D model) is stored in the device 106.

Figure 2A:
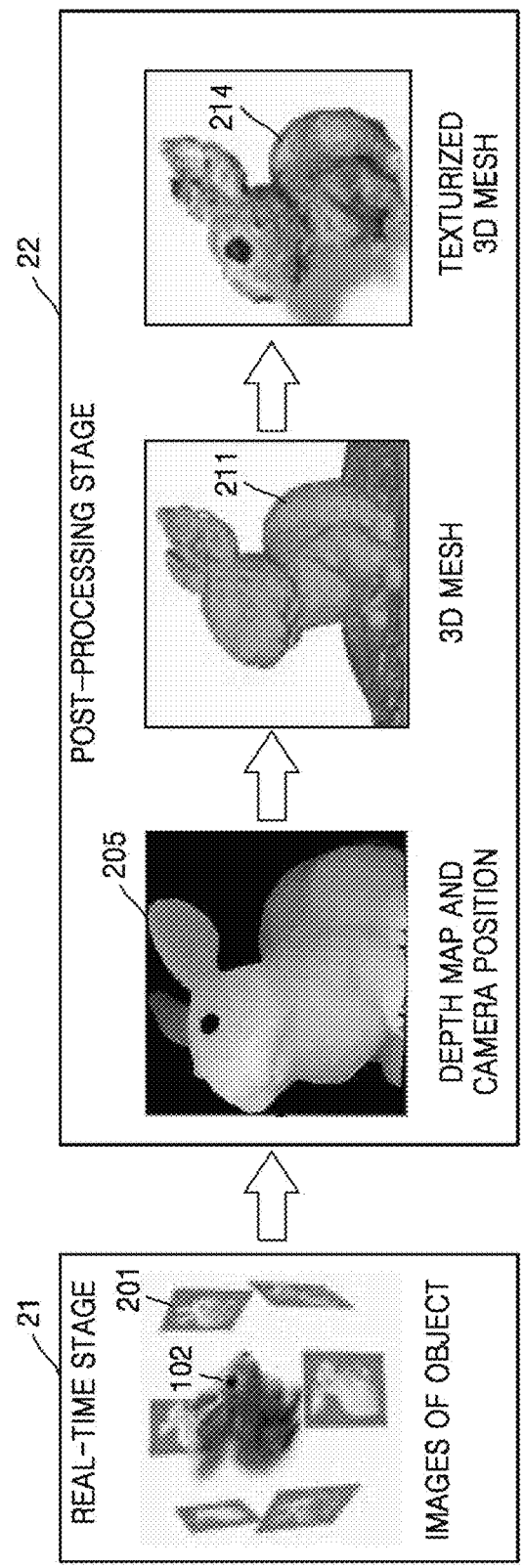
FIG. 2A is a diagram for describing a 3D reconstruction process according to an embodiment of the present disclosure.

FIG. 2A is a diagram for describing a 3D reconstruction process according to an embodiment of the present disclosure.

Referring to FIG. 2A, the 3D reconstruction process includes a real-time stage 21 and a post-processing stage 22.

During the real-time stage 21, the device 106 captures images 201 of the object 102 while being moved by a user along a trajectory around the object 102. Each of the images 201 includes information about the object 102 and a background.

During the post-processing stage 22, the device 106 first generates a depth map 205 regarding the object 102 included in the images 201. Since the images 201 are captured in different camera orientations, the depth map 205 may include information about a depth of the object 102 in each camera orientation. Then, the device 106 reconstructs a representation of a 3D mesh 211 regarding the object 102 by fusing the depth maps 205 respectively corresponding to the camera orientations. Finally, the device 106 generates a texturized 3D mesh 214 by texturing the 3D mesh 211 based on texture information of the object 102 obtained from the images 201. The texturized 3D mesh 214 may be a representation of a reconstructed 3D model of the object 102.

Figure 2B:
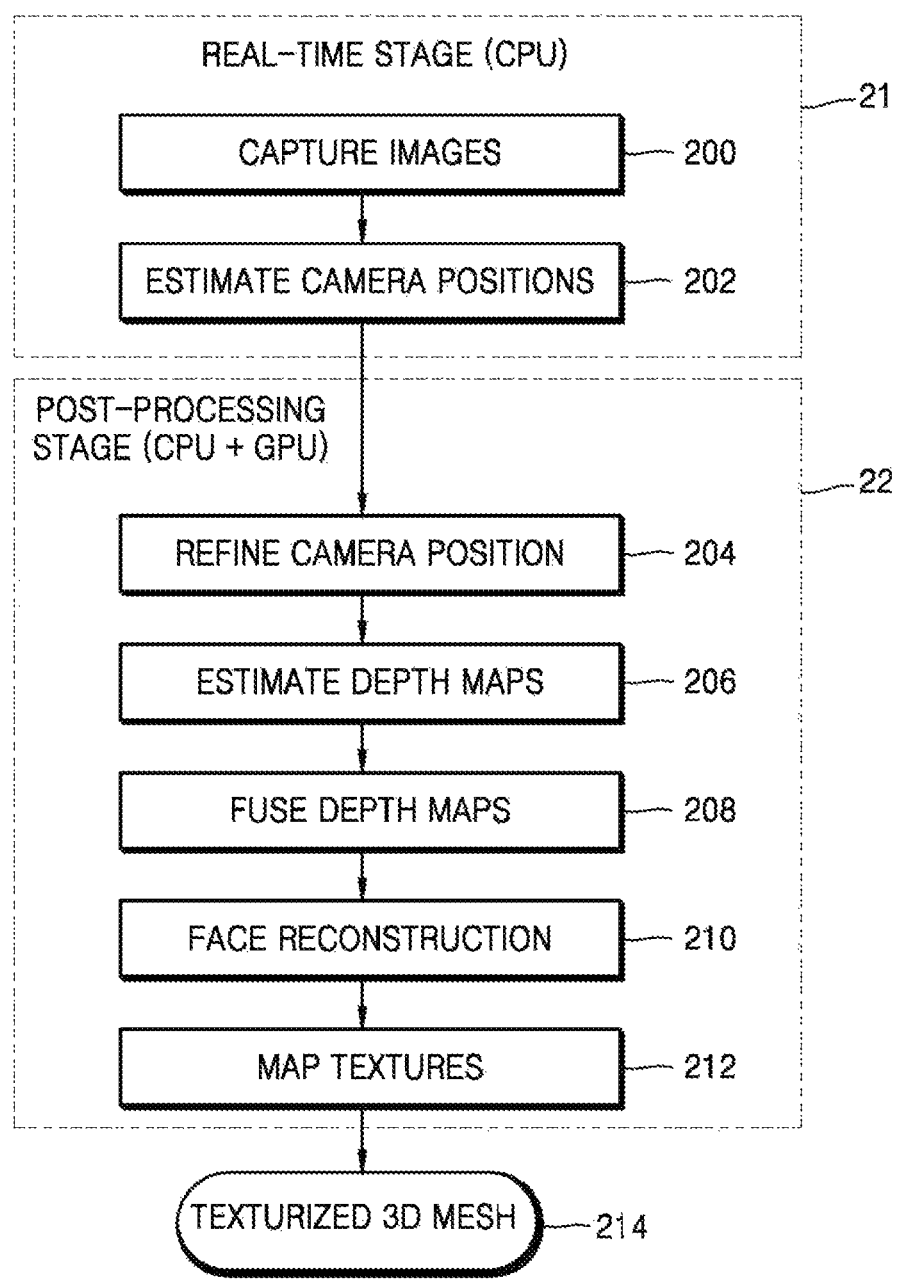
FIG. 2B is a flowchart of a 3D reconstruction process according to an embodiment of the present disclosure.

FIG. 2B is a flowchart of a 3D reconstruction process according to an embodiment of the present disclosure.

Referring to FIG. 2B, the 3D reconstruction process may include two main stages, i.e., the real-time stage 21 and the post-processing stage 22.

The real-time stage 21 includes a sub-stage 200 at which images of the object 102 are captured as described above with reference to FIG. 1B, and a sub-stage 202 at which camera positions are estimated by using the captured images.

The estimated camera positions may be characterized by a set of different parameters. The set of parameters may include camera coordinates and camera orientations in a space. The camera orientation may be defined by yaw, pitch, and roll angles. The sub-stage 202 may be performed by using a simultaneous localization and mapping (SLAM) system. By using the SLAM system, it is possible to estimate not only a trajectory of a camera but also an orientation of the camera at each moment of time by using the camera coordinates and parameters of the camera orientations. By using the SLAM system, a robust camera position may be estimated under any capturing conditions, such as translation, rotation, and shaking movements. The real-time stage 21 may be performed by the CPU of the device 106.

After the real-time stage 21 is completed, the post-processing stage 22 is performed. The post-processing stage 22 may be performed by both of the CPU and the GPU of the device 106, and usually takes several seconds.

It is known that the SLAM system usually leads to a significant drift in a trajectory. Accordingly, a complete circular trajectory may be estimated as an incomplete arc. Thus, in order to increase accuracy of the estimated camera positions (both the trajectory and the orientation of the camera), the estimated camera positions are refined in a sub-stage 204. For the refining, all types of available information related to a start point and an end point of the trajectory may be used.

The camera positions may be estimated in two operations in a coarse-to-fine manner. Coarse estimation is performed by using the SLAM system while the object 102 is scanned. Then, fine estimation is performed by refining coarse-estimated camera positions based on the information related to the start and end points of the trajectory, for compensation for drift caused by configuration peculiarities of the SLAM system.

During a sub-stage 206, depth maps are generated based on the refined camera positions and the captured images.

During a sub-stage 208, the depth maps obtained from the different camera positions are fused.

During a sub-stage 210, a surface mesh, i.e., a surface reconstruction, is generated by fusing the depth maps. The surface mesh is a 3D representation of the object 102.

During a sub-stage 212, textures are mapped onto the surface mesh. By mapping the textures onto the surface mesh, the texturized 3D mesh (or a 3D model) 214 that is a 3D reconstruction result of the object 102 is generated. The texturized 3D mesh 214 may be output through a display of the device 106.

Fast 3D model reconstruction may be performed by extracting depth maps at a high speed and fusing the depth maps using the CPU and the GPU of the device 106. Also, high quality 3D model reconstruction may be provided via accurate surface reconstruction and texture mapping.

Hereinafter, the sub-stages 200 through 212 in the 3D reconstruction process will be described in detail.

Figure 3:
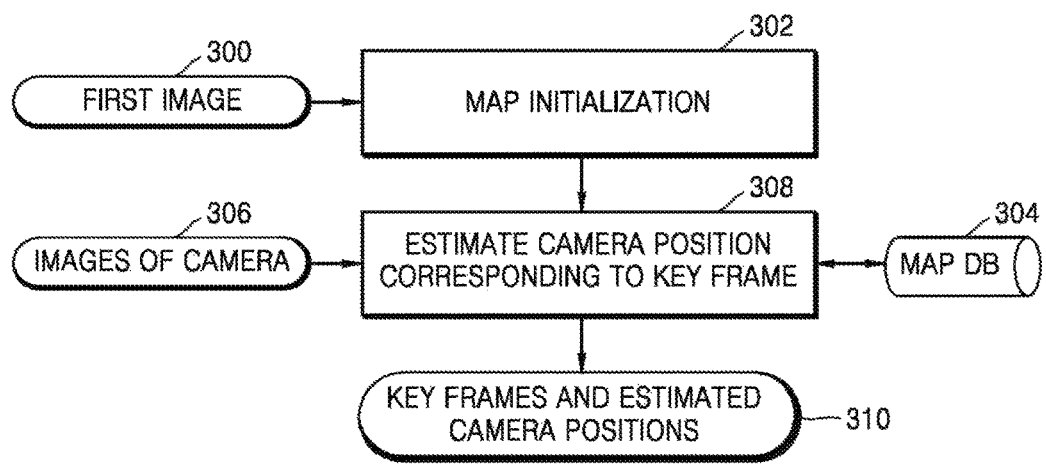
FIG. 3 is a diagram for describing estimating of a camera position according to an embodiment of the present disclosure.

FIG. 3 is a diagram for describing estimating of a camera position according to an embodiment of the present disclosure. Camera position estimation shown in FIG. 3 may be related to the sub-stage 202 of FIG. 2B.

Referring to FIG. 3, the camera position estimation may begin by performing map initialization 302 using a first image 300. The map initialization 302 denotes initialization of the camera position estimation. A world reference frame for the map initialization 302 is assigned to be the same as a reference frame of the first image 300. A features from accelerated segment test (FAST) algorithm using corner detection may be used to extract key points from the first image 300. The FAST algorithm is disclosed in, for example, Edward Rosten and Tom Drummond, "Fusing points and lines for high performance tracking", In Computer Vision, 2005, ICCV 2005, Tenth Institute of Electrical and Electronics Engineers (IEEE) International Conference, volume 2, pages 1508-1515, IEEE, 2005. A mean scene depth is assigned to each extracted key point. A map database (DB) 304 stores the key points extracted according to the FAST algorithm together with the assigned mean scene depth. The key points in the map DB 304 are stored in the word reference frame that is the same as the reference frame of the first image 300.

All sequential images 306 captured by a camera (i.e., the scanning module) of the device 106 are used together with maps stored in the map DB 304 to determine which frame (or image) corresponds to a key frame for tracking and 3D reconstruction. Camera positions corresponding to the key frames may be estimated in operation 308 by updating the maps stored in the map DB 304. The results of the sub-stage 202 of FIG. 2B are the key frames and the estimated camera positions 310.

Figure 4:
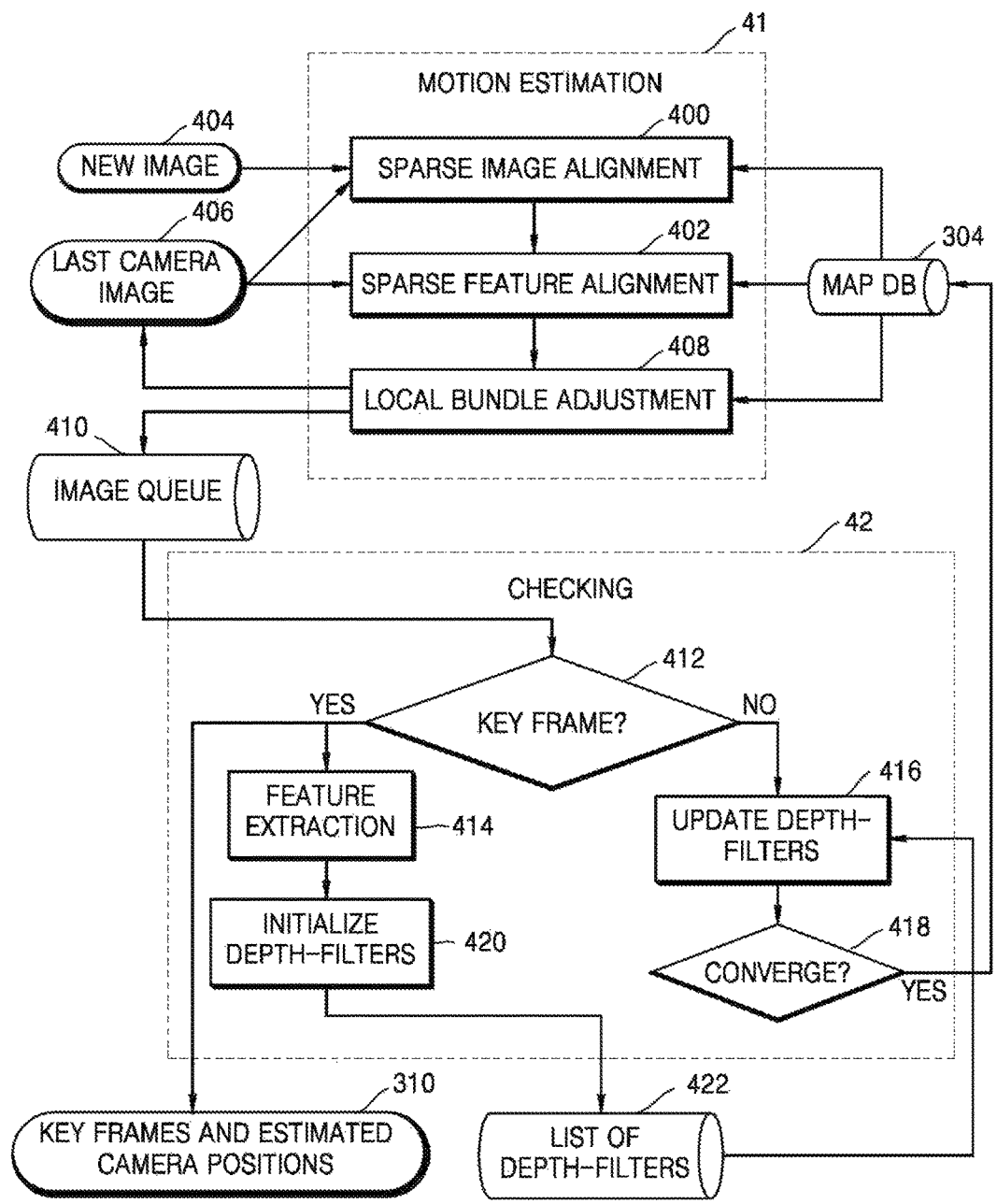
FIG. 4 is a diagram for describing estimating of a camera position by processing a new image according to an embodiment of the present disclosure.

FIG. 4 is a diagram for describing estimating of a camera position by processing a new image 404, according to an embodiment of the present disclosure.

Referring to FIG. 4, camera position estimation may include a motion estimation stage 41 and a checking stage 42. The SLAM system described above with reference to FIG. 3 may also be used in the camera position estimation of FIG. 4. By using the camera position estimation of FIG. 4, not only a trajectory of the camera, but also a camera orientation at each moment of time may be estimated.

The motion estimation stage 41 includes a sub-stage 400 for sparse image alignment, a sub-stage 402 for sparse feature alignment, and a sub-stage 408 for local bundle adjustment.

During the sub-stage 400 for the sparse image alignment, a camera position corresponding to the new image 404 is estimated based on key points of a map stored in the map DB 304. The key points of the map are projected onto the new image 404, and the camera position corresponding to the new image 404 is estimated by using a Direct Image Alignment algorithm.

During the sub-stage 402 for the sparse feature alignment, the new image 404 and the camera position corresponding to the new image 404 are used. The key points of the map are projected onto the new image 404, and a position of each key point in the new image 404 is refined by using a Lucas Kanade tracker (LKT or KLT). The LKT tracks a patch (rectangular area) around a projection of the key point by using gradient descent. The LKT is disclosed in, for example, Simon Baker and Iain Matthews, "Lucas-kanade 20 years on: A unifying framework", International journal of computer vision, 56(3):221-255, 2004.

During the sub-stage 408 for the local bundle adjustment, the new image 404, the camera position corresponding to the new image 404, and a list of map points are used together with the refined positions of the key points of the new image 404. The camera position is calculated based on initial approximation obtained during the sub-stage 400, point coordinates stored in the map DB 304, and the refined positions of the key points obtained in the sub-stage 402, which is a classical Perspective-n-Point (PnP) problem. The calculated camera position may be assigned to the new image 404, and used during another stage (or another sub-stage) without further changes. After refining the camera position, 3D world coordinates of the map points may also be refined.

The new image 404 after the sub-stage 408 may be set as a last camera image 406 to be additionally used during the sub-stages 400 and 402.

The new image 404 and the camera position corresponding to the new image 404 are stored in an image queue 410. Images in the image queue 410 may be used during the checking stage 42 later.

During a sub-stage 412 of the checking stage 42, it is checked whether an image input from the image queue 410, for example, the new image 404, is a key frame.

When it is checked that the new image 404 is a key frame, the new image 404 is stored in a list of the key frames and estimated camera positions 310, together with the camera position corresponding to the new image 404. Then, during a sub-stage 414, feature extraction is performed on the new image 404.

During a sub-stage 420, depth-filters with a depth expectation equal to a current mean scene depth is created for each feature point and stored in a list 422 of active depth-filters for depth-filtering. Examples of the depth-filtering are disclosed in "Video-based, real-time multi-view stereo" by George Vogiatzis and Carlos Hernandez, Image and Vision Computing, 29(7):434-441, 2011.

In order to satisfy 360° scanning conditions, the depth-filters are prolongated from previous key frames. Patches of the depth-filters that are not processed yet are aligned on a last key frame, and a new patch is bound to each depth-filter while a depth-filter state is unchanged.

When it is checked that the new image 404 is not a key frame, a sub-stage 416 for updating the depth-filters is performed. During the sub-stage 416, a search along an epipolar line is performed to align a feature point from the list 422 with a point in the new image 404. After the alignment, a point depth is calculated by using triangulation techniques. The point depth is registered in the depth-filter of the corresponding point. Then, during a sub-stage 418, each depth-filter is checked for convergence. If a depth-filter is converged (for example, when a depth variation is sufficiently small), an associated point is added to the map DB 304 and excluded from the list 422 of active depth-filters.

The motion estimation stage 41 and the checking stage 42 are performed on each captured image. After all captured images are processed, a full list of the key frames 310 and the estimated camera positions 310 are used during the sub-stage 204 (camera position refinement) described with reference to FIG. 2B.

Figure 5:
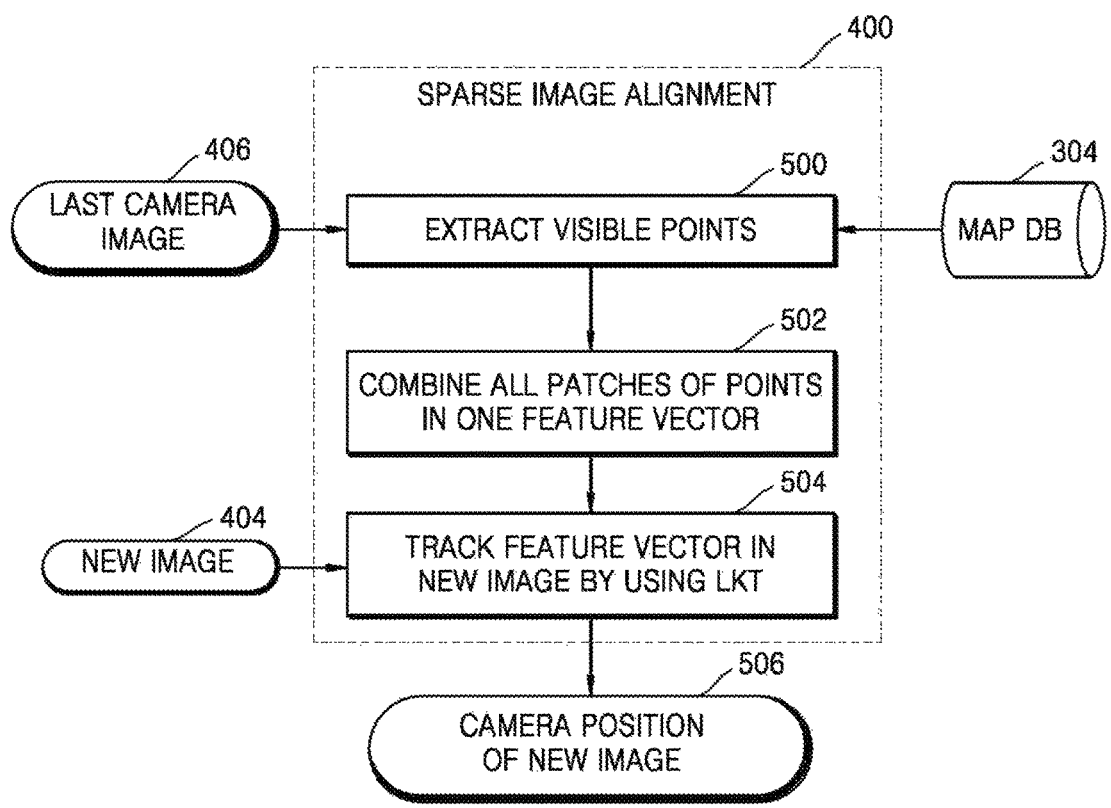
FIG. 5 is a diagram for describing sparse image alignment according to an embodiment of the present disclosure.

FIG. 5 is a diagram for describing sparse image alignment 400 according to an embodiment of the present disclosure.

Referring to FIG. 5, in operation 500, visible points for the last camera image 406 are extracted from the map DB 304. The visible points may be filtered to satisfy the 360° scanning conditions. Meanwhile, in order to satisfy the 360° scanning conditions, points captured under significantly different directions of view may be excluded because images including such points are largely different from an original patch and tracking is not reliable. Also, points that are occluded by other points may also be excluded. A z-buffer technique may be used to filter such points.

In operation 502, patches of all filtered points are combined in one feature vector. In operation 504, the feature vector is tracked by using the LKT in the new image 404. Then, a camera position 506 of the new image 404 is obtained from the LKT.

Figure 6:
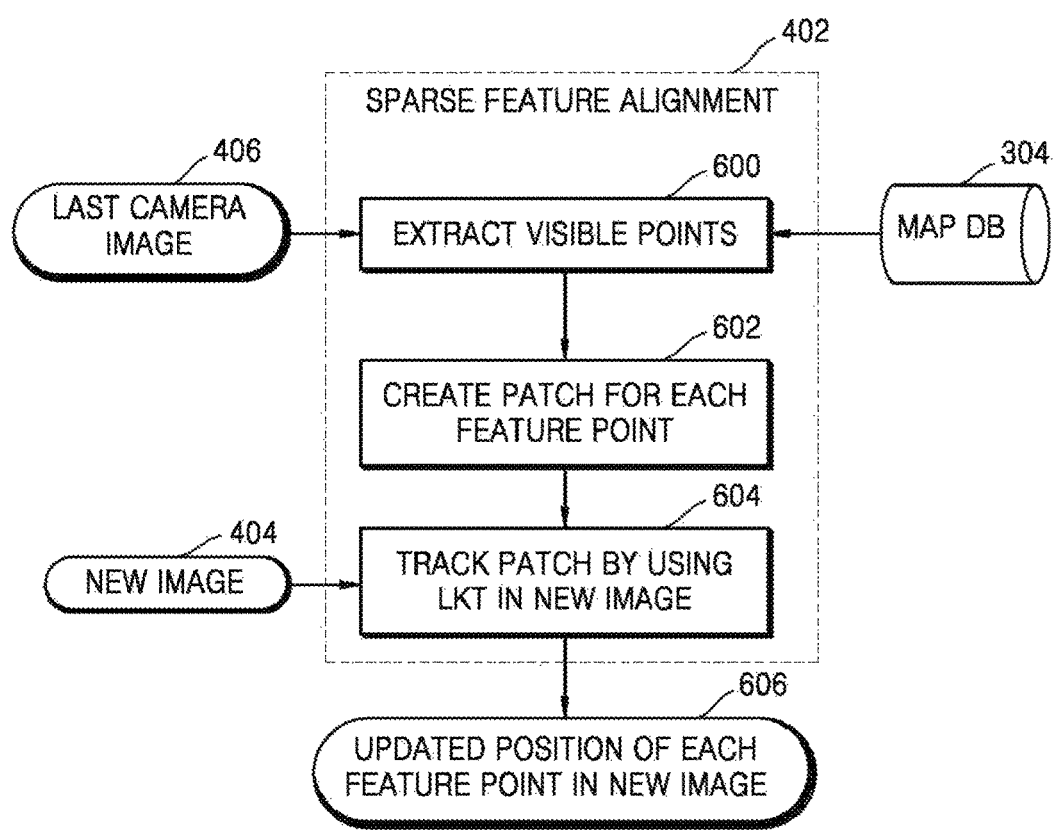
FIG. 6 is a diagram for describing sparse feature alignment according to an embodiment of the present disclosure.

FIG. 6 is a diagram for describing sparse feature alignment 402 according to an embodiment of the present disclosure.

Referring to FIG. 6, in operation 600, visible points for the last camera image 406 are extracted from the map DB 304, taking into account the estimated camera position. In operation 602, a patch is independently created for each feature point. In operation 604, each patch is tracked by using the LKT in the new image 404. An updated position of each feature point in the new image 404 is obtained in operation 606.

Figure 7:
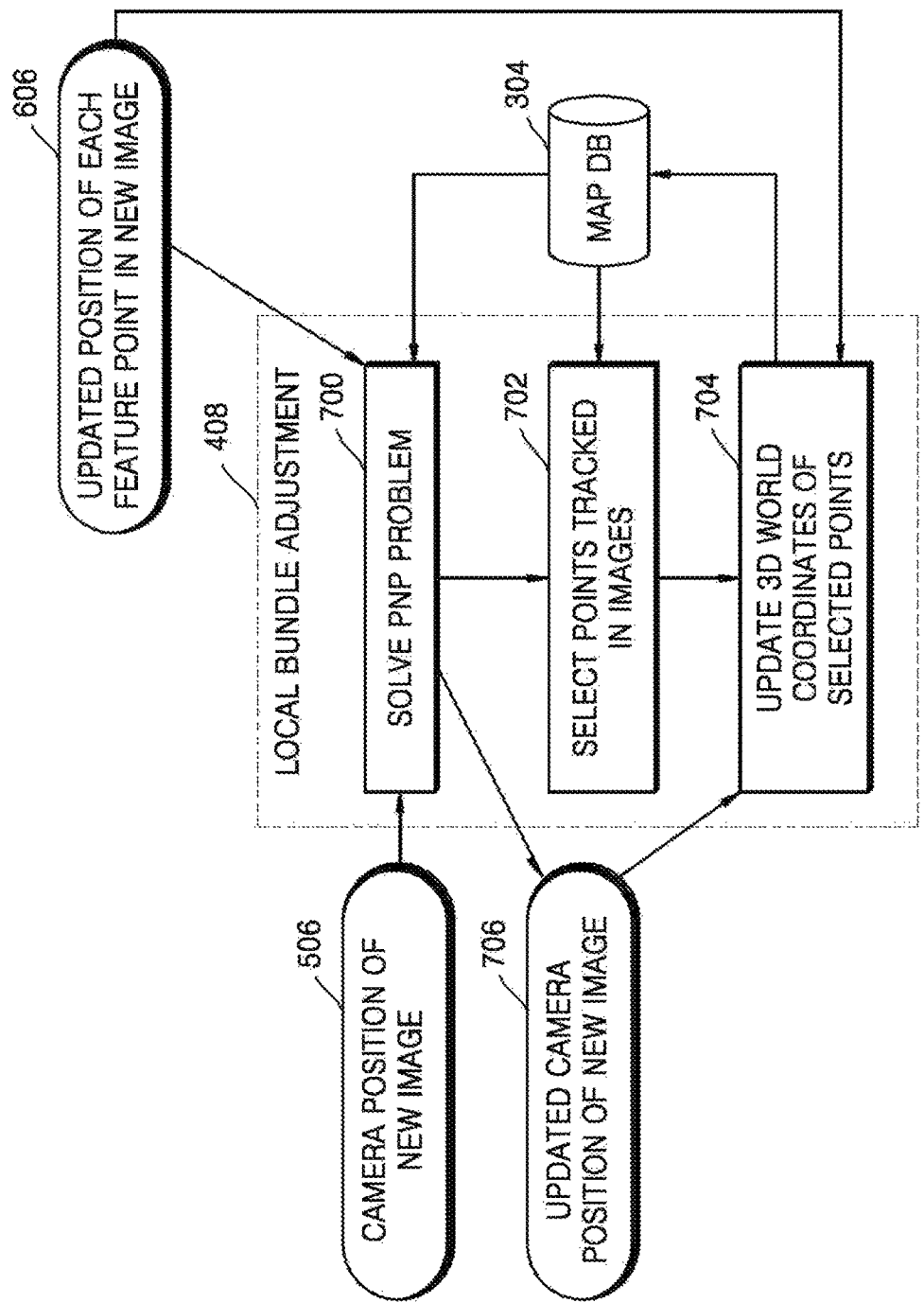
FIG. 7 is a diagram for describing local bundle adjustment according to an embodiment of the present disclosure.

FIG. 7 is a diagram for describing local bundle adjustment 408 according to an embodiment of the present disclosure.

Referring to FIG. 7, in operation 700, the camera position 506 of the new image 404 is updated with a PnP procedure based on the initial approximation obtained in the sub-stage 400 and the updated position 606 of each feature point in the new image 404 obtained in the sub-stage 402. As such, an updated camera position 706 of the new image 404 is obtained. The updated camera position 706 is assigned to the new image 404.

In operation 702, points used several times during the sub-stage 402 are selected for structure optimization. In operation 704, word 3D coordinates of the selected points are updated by using bundle adjustment techniques using the updated positions 606 of the feature points and the updated camera position 706. The updated world 3D coordinates are stored in the map DB 304.

Figure 8:
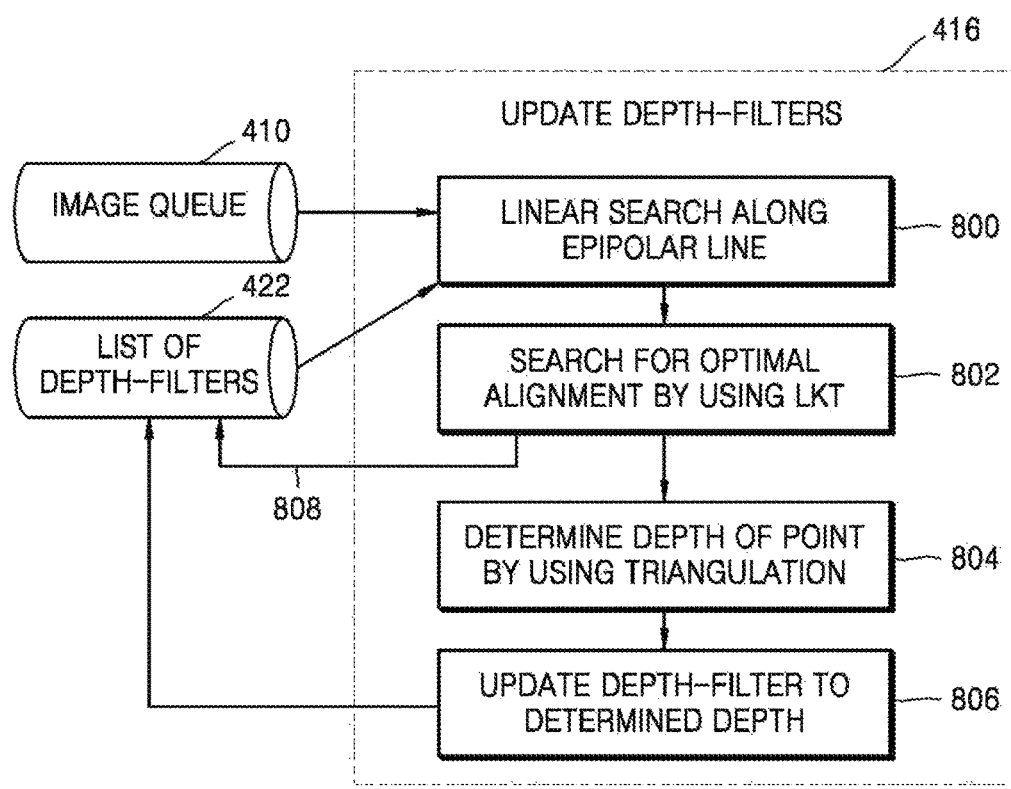
FIG. 8 is a diagram for describing updating of depth-filters according to an embodiment of the present disclosure.

FIG. 8 is a diagram for describing a sub-stage 416, i.e., an updating of depth-filters according to an embodiment of the present disclosure.

Referring to FIG. 8, the depth-filters are updated for each image that is not a key frame in the image queue 410. An epipolar line in a new image is calculated for each depth-filter in the list 422. In operation 800, a linear search around a depth expectation along the epipliar line is performed. In operation 802, the LKT searches for optimal alignment of points from the depth-filter around an epipliar search minimum. When the optimal alignment is not found, the depth-filter is updated with a fault flag 808. When the optimal alignment is found, a depth is found by using a triangulation procedure in operation 804. In operation 806, the depth-filter is updated to the determined depth. The updating of the depth-filter is used to determine new mathematical expectation and variance of a depth value for the depth-filter.

Figure 9:
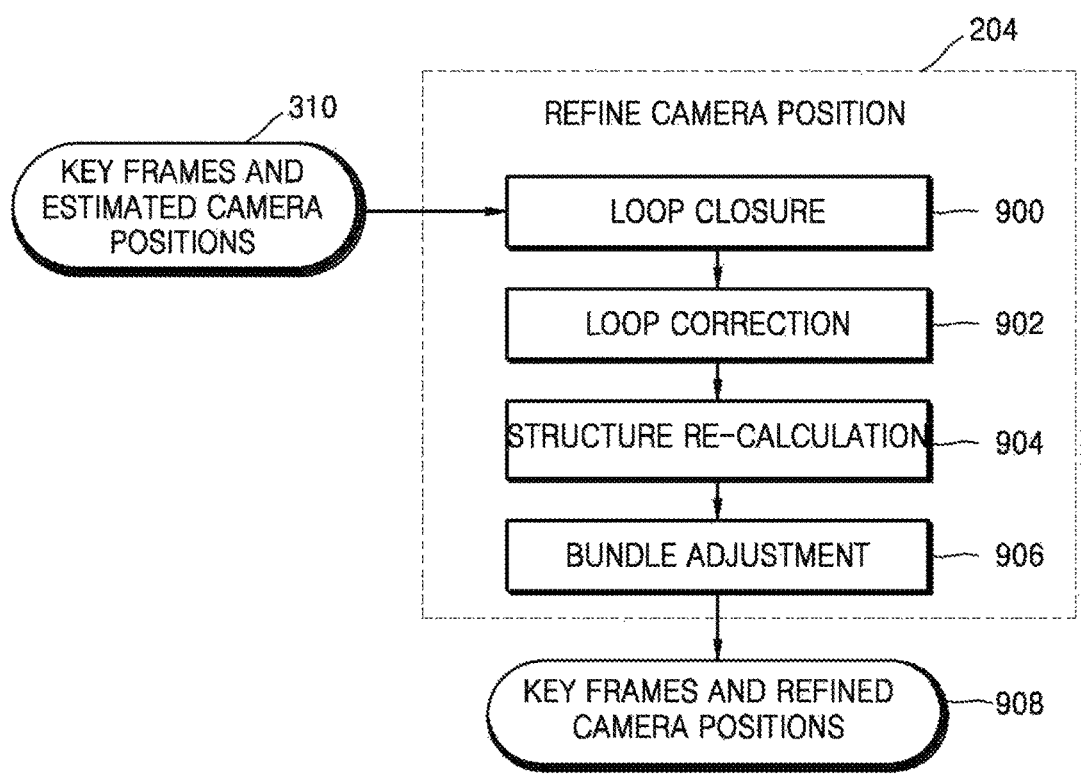
FIG. 9 is a diagram for describing camera position refinement according to an embodiment of the present disclosure.

FIG. 9 is a diagram for describing a sub-stage 204, i.e., camera position refinement according to an embodiment of the present disclosure.

When the real-time stage 21 including the sub-stages 200 and 202 are finished, the post-processing stage 22 of the 3D reconstruction process using the CPU and the GPU of the device 106 begins as shown in FIG. 2B.

The sub-stage 204 may be executed by using the CPU of the device 106. The camera positions obtained by the SLAM system may include a significant drift and may be needed to be refined before additional processing. Such a drift may be expressed as a systematic error in estimating of x, y, and z coordinates and yaw, pitch, and roll angles of the camera. The camera positions are refined to compensate for the drift, thereby increasing the overall accuracy of the camera positions. If the trajectory 108 is circular, the trajectory 108 may have natural loop closure points. Once a loop closure point is detected, it is possible to estimate and compensate for an accumulated drift of the camera positions. The camera position refinement includes four operations, i.e., loop closure in operation 900, loop correction in operation 902, structure re-calculation in operation 904, and bundle adjustment in operation 906.

Referring to FIG. 9, in operation 900, a loop point of a trajectory is sought, and for each received key frame, it is checked whether the loop point is a candidate for a loop closure point. For each key frame, a relative Euclidean distance in a SE3 space to other key frames is calculated. When the calculated relative Euclidean distance is equal to or smaller than a threshold value $\xi_{sim}$, it is checked how many common map points the key frames have. When to key frames $KF_i$ and $KF_k$ have more map points than $n_{KFpt}$, a relative pose constraint $\xi_{ik}$ is computed using the PnP algorithm from common point projections. Two key frames that are spatially adjacent to each other have a few or no common points. Thus, these two key frames are considered as candidates for a loop closure point. For performing loop closure, it is required to compute a position constraint using the PnP algorithm, which requires feature correspondences. At locations of point projections of the key frame $KF_i$, a set of binary robust invariant scalable keypoints (BRISK) features $ft_i$ invariant to scale and rotation are extracted, and from the key frame $KF_j$, a set of similar features $ft_k$ are extracted at locations of FAST corners. BRISK is disclosed in Stefan Leutenegger, Margarita Chli, and Roland Yves Siegwart. Brisk: Binary robust invariant scalable keypoints. in computer vision (ICCV), 2011 IEEE International Conference on, pages 2548-2555. IEEE, 2011. The BRISK features have limited viewpoint change invariance. Since the trajectory is circular, viewpoint change when revising the same part of trajectory is very little.

From the two sets described above, feature correspondences are found. Since 3D coordinates for features in the set $ft_i$ are known, the position of the key frame $KF_k$ relative to $KF_i$ may be computed using the PnP algorithm, resulting in a forward constraint $\xi_{ik}^{ft}$. The same procedure is performed for $KF_k$, resulting in a backward constraint $\xi_{ki}^{ft}$. Feature matching may give wrong correspondences that may result in a wrong PnP solution. In order to avoid the inclusion of wrong PnP solutions into the camera position refinement, a reciprocal check is performed: according to properties of a Lie group, if there are two camera positions containing no error, forward and backward constraints should agree: $\xi_{ik}^{ft}=(\xi_{ki}^{ft})^{-1}$. Thus a disagreement between the forward and backward constraints may be computed as $err_{rc}=\|\ln(\xi_{ik}^{ft}\cdot(\xi_{ki}^{ft})^{-1})\|$. If the disagreement $err_{rc}$ is equal to or smaller than a threshold value $err_{rc}^{th}$, the forward constraint $\xi_{ik}^{ft}$ and backward constraint $\xi_{ki}^{ft}$ are added into optimization; otherwise, the forward constraint $\xi_{ik}^{ft}$ and backward constraint $\xi_{ki}^{ft}$ are considered as invalid and are ignored.

The forward and backward constraints computed in operation 900 are used during operation 902. Due to the drift for a first key frame and a loop closure key frame (an end key frame), the forward and backwards constraints disagree. In order to compensate for the drift, the camera position corresponding to each key frame is re-estimated such that the disagreement is distributed among frames. A SLAM approach provides a variance to each camera position. The variance indicates to what extend the camera position is corrupted by measurement noise and a camera drift. Key frames having a high position variance are provided with stronger position correction, while key frames having a low variance are provided with less position correction. As a result, the accuracy of the camera positions may be increased due to drift removal.

Optimized camera positions are then calculated in operation 904, where 3D coordinates of points are updated due to changes in the camera positions. The optimized camera positions are calculated such that a depth (z coordinate) of a point with respect to the first key frame is the same as before loop correction.

In operation 906, final refinement of the camera positions is performed to decrease the measurement noise. For each key frame $KF_i$, a projection $uv_m^i$ of point m obtained through alignment in the SLAM approach is compared to a predicted projection computed according to $uvp_m^i = \pi(SE3_i * p_m)$, and a point re-projection error is calculated according to $err(m,i) = \|uv_m^i - uvp_m^i\|$. total re-projection error is computed according to $err_{ba} = \Sigma_{i=0, m=0}^{i=m, m=M} err(m,i)$. The total re-projection error accounts for the measurement noise presented in the camera positions. The bundle adjustment reduces the total re-projection error by jointly optimizing the camera positions and the 3D coordinates of the points. The bundle adjustment is done by performing Gaussian optimization through an iterative correction of the 3D coordinates of the points and the camera positions in a direction of decreasing the total re-projection error. After the optimization, a set of key frames with the refined camera positions is used in operation 908 for further processing.

Figure 10:
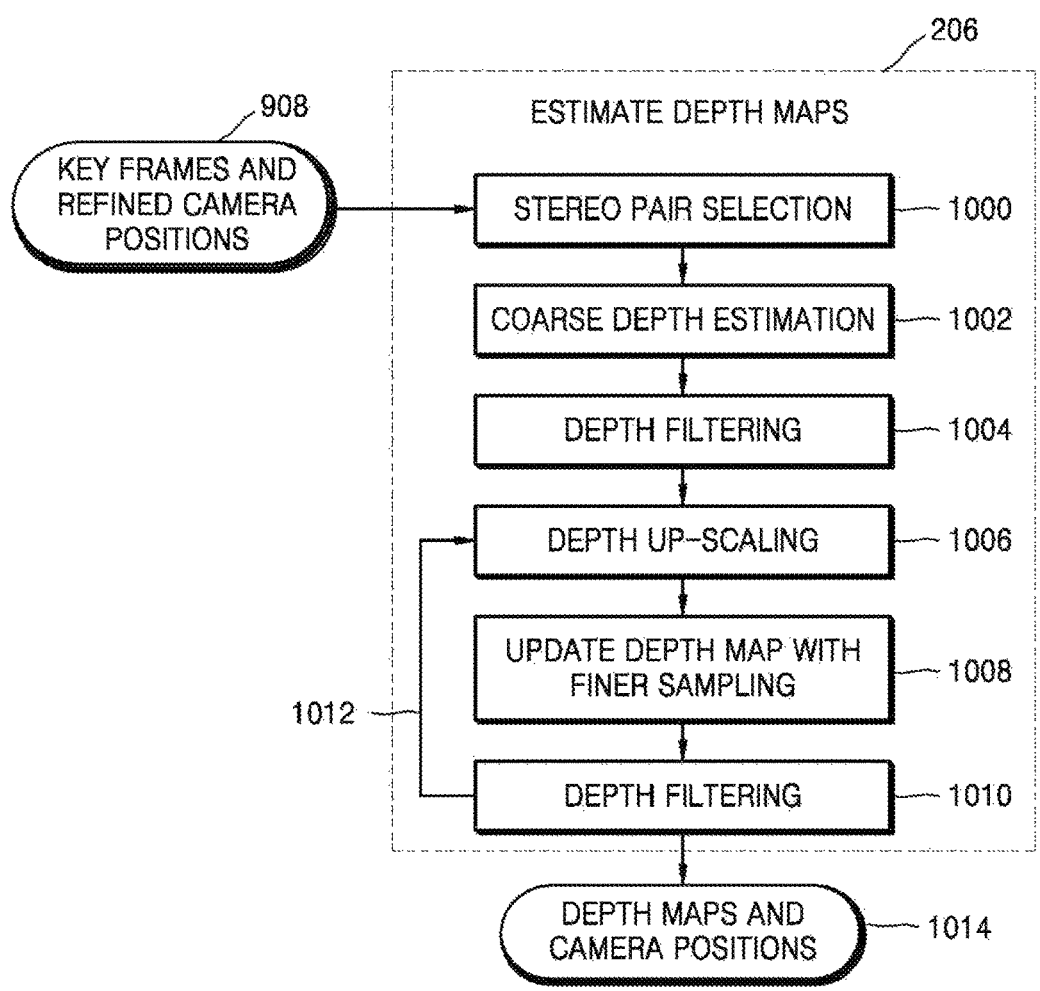
FIG. 10 is a diagram for describing depth map estimation according to an embodiment of the present disclosure.

FIG. 10 is a diagram for describing a sub-stage 206, i.e., depth map estimation according to an embodiment of the present disclosure.

Referring to FIG. 10, the key frames with the refined camera positions, which are obtained as results of performing the sub-stage 204, are used as inputs of the sub-stage 206. In operation 1000 for stereo pair selection, for each key frame, another frame is selected and a non-rectified stereo pair is formed. Second frame selection is based on the camera positions to ensure a sufficient, but not too large translational motion between the images of the stereo pair. The stereo pair and relative camera positions are used for depth map computation.

The depth map is computed with a coarse-to-fine pyramidal approach. In operation 1002 for coarse depth estimation, low resolution sampling is used with respect to the images from the stereo pair, which results in a low resolution depth map. The low resolution depth map may be further filtered in operation 1004 for depth filtering. Then, on a next pyramid level, finer resolution sampling is used and the low resolution result from the previous operation is up-scaled in operation 1006 and used to estimate a depth map of a current pyramid level. The estimating of the depth map is refined with a finer sampled image on the current pyramid level in operation 1008, and may be further filtered in operation 1010. Such an up-sampling procedure may be performed several times via a loop 1012, until a depth map of desired resolution is obtained or until runtime limits are met.

On a first (coarsest) pyramid level, only a small number of pixels are processed, so a more complicated and more accurate depth map estimation method may be used. For example, in case of block-matching or cost-volume filtering methods, a larger window size may be used, which usually provides better accuracy at the cost of bigger runtime.

Operation 1002 for the coarse depth estimation may include sub-stages, i.e., estimation of a search range and sampling, computation of matching costs, aggregation of costs, disparity estimation based on cost minimization, and depth triangulation. The search range is estimated from given estimations of possible near and far depth values for a current pixel in a first image. Here, the current pixel may be obtained from a sparse point cloud of a reconstructed scene created during the SLAM approach. The depth values allow determining a search segment on an epipolar line corresponding to the current pixel. Then, pixel sampling may be used with respect to a search segment on a second image in order to determine possible locations of a second image point corresponding to the current pixel in the first image. The matching cost is computed from a pixel-wise color difference or other distance metric on an image color or gradient. The cost aggregation is performed by a weighted accumulation of costs in some regions around the current pixel. The disparity is estimated by a winner-takes-all (WTA) cost minimization strategy along search segments on the epipolar line. The depth is triangulated from corresponding point locations on both images of the stereo pair using epipolar constraints.

Despite that the images in the stereo pair are not rectified, the current algorithm provides very efficient parallel implementation on the GPU of the device 106. Memory consumption may be also reduced because there is no need to store full cost-volume in the memory. The image may be processed in small regions and for each of the regions, matching cost values may be stored in a GPU local memory.

Since the computed depth maps are used in depth map fusion, wrong depth map estimations may be filtered out as much as possible and only the depth values which are accurate with highest confidence may be left, because fusion methods may usually handle well missing data by interpolation or propagation from existing values, but are more sensitive to heavy outliers. Depth outliers may be efficiently filtered out by analyzing accumulated ratios of cost to a minimal value for current pixel during WTA cost minimization. Additional filtering may be performed with left-right consistency check. Outlier filtering may be also incorporated into the coarse-to-fine strategy, by performing it on each pyramid level and thus reducing computational effort on finer pyramid levels.

Operations 1004 and 1010 for depth filtering includes sub-stages, i.e., filtering by photometric ambiguity and left-right consistency check. The photometric ambiguity is estimated during WTA cost minimization and is calculated by analyzing accumulated ratios of cost to a minimal value for the current pixel. When texture is absent or ambiguous (periodic along the epipolar line), many costs will have similar values to the minimal cost, causing ratios to be around 1, which allows to filter these ambiguities by analyzing the ratios. The left-right consistency check is performed by analyzing the consistency of both depth maps for the left and right images in the stereo pair. The consistency is determined by checking re-projection errors for each pixel using depth values from both depth maps.

The depth filtering allows one to significantly reduce the number of pixels to be processed on a next pyramid level. Performing depth filtering on each level significantly reduces a runtime, because finer pyramid levels are typically much slower than coarse pyramid levels.

The depth map updating on the next pyramid level includes two operations, i.e., coarse depth map up-scaling in operation 1006 and depth map refinement in operation 1008. A coarse depth map may be up-scaled to finer resolution using various filtering methods, such as nearest-neighbor, bilinear, box filtering, Gauss filtering, color image guided bilateral, or other edge-preserving filtering. In depth up-scaling, simple bilinear filtering with support of missing values is used for performance improvement. The up-scaled depth is used before the depth map refinement in operation 1008. During each operation, a matching cost is re-evaluated with finer sampling corresponding to the current pyramid level. The corresponding point is found from the minimization of refined cost values among all operations, and the depth is triangulated again. The reduction of a support region for an estimated pixel on each finer pyramid level decreases an effect of smoothing and yields more accurate depth values.

The result of the sub-stage 206 is a set of depth maps with the camera positions 1014, and the set of depth maps stores information about a depth of the captured object for every key frame.

Figure 11:
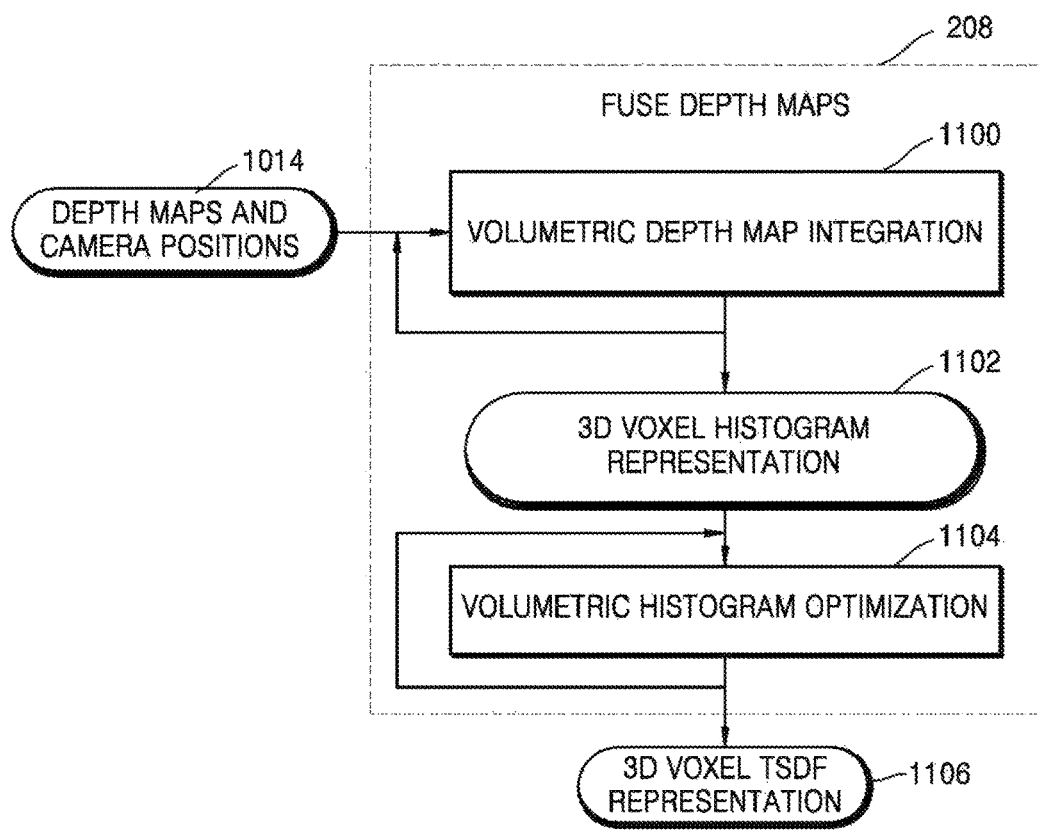
FIG. 11 is a diagram for describing depth map fusion according to an embodiment of the present disclosure.

FIG. 11 is a diagram for describing a sub-stage 208, i.e., depth map fusion, according to an embodiment of the present disclosure.

Referring to FIG. 11, in operation 1100 for volumetric depth map integration, the set of depth maps with the camera positions computed in the sub-stage 206 are processed to obtain volumetric depth map integration or fusion. The result of such fusion is used to generate a 3D voxel histogram representation in operation 1102. For every voxel, an approximate signed distance to the surfaces induced by the depth maps is computed, clamped to a user-supplied threshold value, scaled to an interval (−1, 1), and stored as a histogram of respective frequencies $n_j$. Each voxel holds a histogram including N bins around evenly spaced bin center $c_j$. N−2 bins are used to represent distribution of values in the interior of the interval (−1, 1), i.e. voxels close to a supposed surface. Two separate bins are reserved for values indicating a larger distance to the surface, one bin counts (scaled) distances smaller than or equal to −1 (occluded voxel) and one bin represents values greater than or equal to 1 (empty voxel). The total number of histogram counts is limited to the number of the available depth maps.

In operation 1104 for volumetric histogram optimization, a variational approach is used. In operation 1106, 3D voxel signed distance function representation (or 3D voxel truncated signed distance function (TSDF) representation) is obtained as an iterative solution of the minimization of an energy function. Here, as described in Christopher Zach, "Fast and high quality fusion of depth maps", In Proceedings of the international symposium on 3D data processing, visualization and transmission (3DPVT), volume 1, CiteSeer, 2008, the energy function may be calculated according to Equation 1 below.

$$E^{TV-L^1} = \int_\Omega \left\{ |\nabla u| + \lambda \sum_j n_j |u - c_j| \right\} d\vec{x}$$

Equation 1

The result of sub-stage 208 is a TSDF representation of the captured object 102, which is one of methods for representing an arbitrary 3D surface, widely used in computer graphics.

Figure 12:
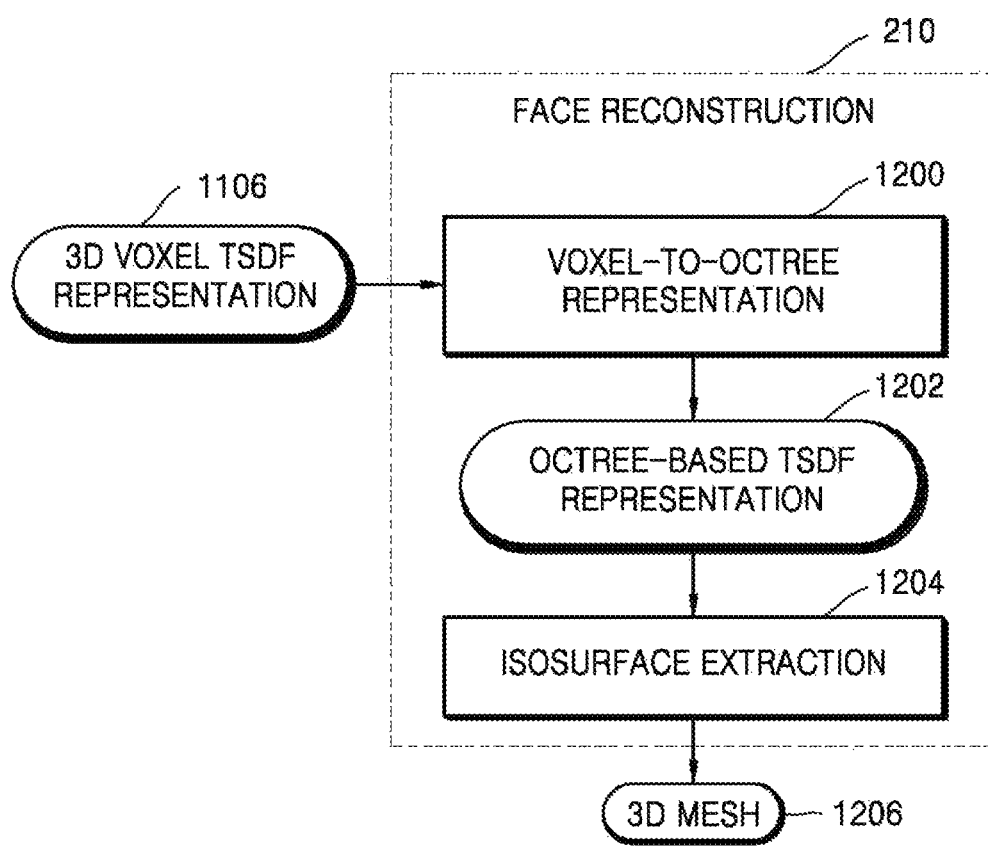
FIG. 12 is a diagram for describing surface reconstruction according to an embodiment of the present disclosure.

FIG. 12 is a diagram for describing a sub-stage 210, i.e., surface reconstruction, according to an embodiment of the present disclosure.

Referring to FIG. 12, operation 1200 for voxel-to-octree representation is performed. The TSDF representation computed in the sub-stage 208 is processed to obtain a voxel-to-octree representation for the object 102. In operation 1202, the voxel-to-octree representation is used to obtain an octree-based TSDF representation. A maximum octree depth controls complexity (the number of polygons) of the 3D mesh of the object 102.

During operation 1204 for isosurface extraction, a 3D mesh 1206 is reconstructed as described in Michael Kazhdan, Allison Klein, Ketan Dalal, and Hugues Hoppe, "Unconstrained isosurface extraction on arbitrary octrees", In Symposium on Geometry Processing, volume 7, 2007.

Figure 13:
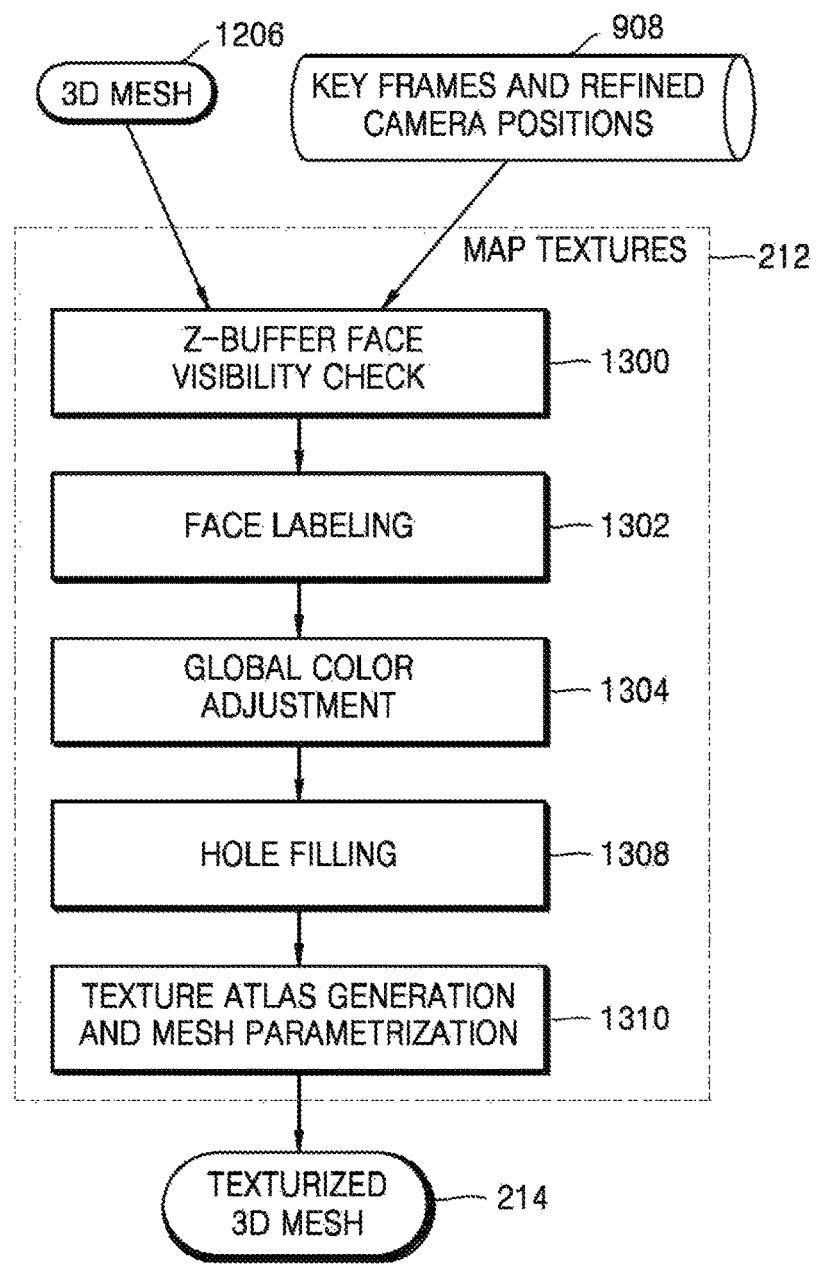
FIG. 13 is a diagram for describing texture mapping according to an embodiment of the present disclosure.

FIG. 13 is a diagram for describing a sub-stage 212, i.e., texture mapping, according to an embodiment of the present disclosure.

Referring to FIG. 13, the 3D mesh 1206 and the key frames and refined camera positions 908 are used as inputs during the texture mapping. In operation 1300 for z-buffer face visibility check, it is checked from which camera positions each face is visible. The camera is characterized by a camera image and a camera position—in other words, the key frames and the refined camera positions 908, respectively.

Each visible mesh face has to be textured by projection to one of the camera images. In operation 1302 for face labeling, it is defined which of the camera images will be used for this purpose. There is a number of patches that are closed areas of mesh faces which are provided with textures from one image. Seams between adjacent patches may be very noticeable. In operation 1304 for global color adjustment, color discontinuities between adjacent patches are adjusted, making the seams less visible.

In operation 1308 for hole filling, textures for invisible mesh faces are created.

In operation 1310 for texture atlas generation and mesh parametrization, a texture atlas from the camera images and textures for invisible faces are created. Also, the mesh parameterization, i.e. defining texture coordinates on the texture atlas for each mesh face, is performed to obtain the texturized 3D mesh 214.

Figure 14:
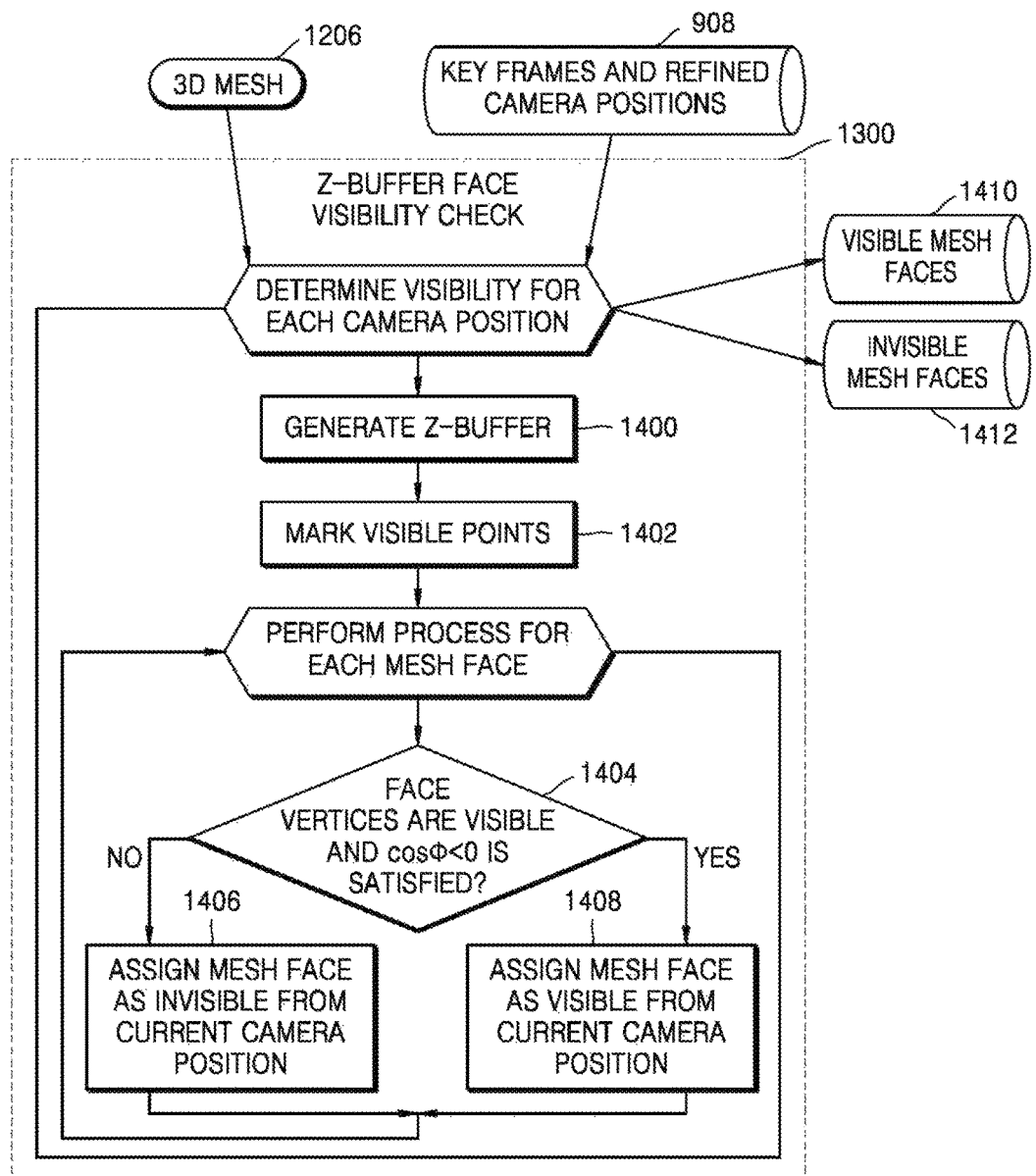
FIG. 14 is a diagram for describing a z-buffer face visibility check according to an embodiment of the present disclosure.

FIG. 14 is a diagram for describing operation 1300, i.e., the z-buffer face visibility check, according to an embodiment of the present disclosure.

The 3D mesh 1206 and the key frames and refined camera positions 908 are used as inputs for the z-buffer visibility check. For each camera position, it is determined what mesh faces are visible.

Referring to FIG. 14, in operation 1400, a z-buffer is generated, and an image having the same size as a camera image, each pixel of which contains a minimal depth of faces that are projected in this pixel, is generated. A depth of a mesh face is a maximal depth of vertices of the mesh face in current camera coordinates.

In operation 1402, next points are separated into visible and invisible. A point p is marked as visible from a camera position r, if p may be projected in a pixel pxl on a camera r image and $z_p \leq z_{buf}(pxl)$ is satisfied. Here, $z_p$ is a depth of the point p in camera r coordinates and $z_{buf}(pxl)$ is a value of the z-buffer in pxl.

Each mesh face $f_i$ is assigned as visible from the camera position r in operation 1408 if all $f_i$ vertices are visible from the camera position r and cos φ<0 is satisfied in operation 1404, and if not, the mesh face $f_i$ is assigned as invisible from the camera position r in operation 1406. Here, φ is an angle between the camera position r in a view direction and the mesh face $f_i$ is an angle of face normal.

As a result, two lists are formed: a list 1410 of visible mesh faces with information from which camera positions the mesh faces are visible, and a list 1412 of invisible mesh faces.

Figure 15:
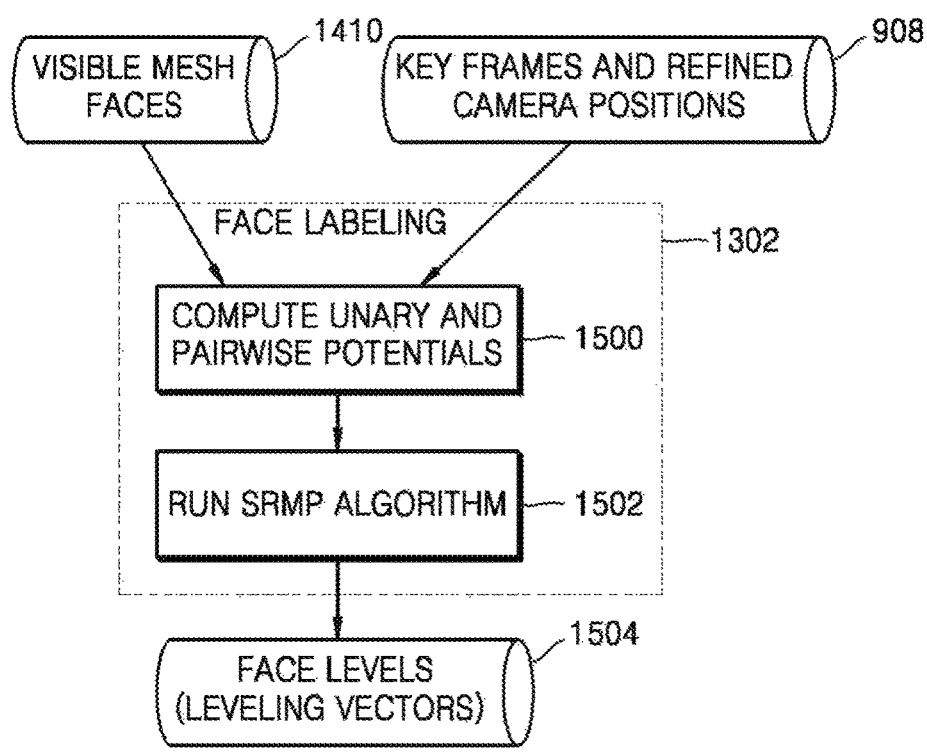
FIG. 15 is a diagram for describing face labeling according to an embodiment of the present disclosure.

FIG. 15 is a diagram for describing operation 1302, i.e., the face labeling, according to an embodiment of the present disclosure.

In operation 1302, a labeling vector l 1504 that defines, for each visible mesh face $f_i$ from the list 1410, textures from a camera image $l_i$ from the key frames 908 is computed. The labeling vector l 1504 is found by Markov random field (MRF) energy minimization, and Equation 2 below may be used.

$$E(l) = \sum_{f_i \in Faces} w_i^{l_i} + \alpha \sum_{(f_i, f_j) \in Edges} w_{i,j}^{l_i, l_j} \to \min_l \qquad \text{Equation 2}$$

The first term defines the quality of texture fragments used for texturing. In this case, $w_i^{l_i} = \sin^2 \varphi$. Here, $\varphi$ denotes an angle between the camera image $l_i$ in a view direction and a face normal of the mesh face $f_i$.

The second term defines visibility of seams between adjacent texture fragments. In this case, if the mesh faces $f_i$ and $f_j$ have an adjacent edge $E_{ij}$, then the visibility of seams is measured with an integral difference of colors of the adjacent edge $E_{ij}$ in the corresponding camera image $l_i$ and texture fragments of the camera image $l_j$. Here, Equation 3 may be used.

$$w_{i,j}^{l_i, l_j} = \int_{E_{ij}} d_{RGB}(Pr^{l_i}(X), Pr^{l_j}(X)) dX \qquad \text{Equation 3}$$

In Equation 3, $Pr^{l_i}$ denotes a projection operator for a view direction of the camera image $l_i$, and $d_{RGB}(\cdot, \cdot)$ denotes an Euclidean distance in a red/green/blue (RGB) color space.

Referring to FIG. 15, in operation 1500, unary potential $w_i$ and pairwise potential $w_{ij}$ are computed for the list 1410 of all visible mesh faces and camera images from the key frames 908. Normalized potentials are used, so α shows trade-off between two energy terms, which is experimentally set to 50.

Next, a sequential reweighted message passing (SRMP) algorithm is run in operation 1502 to solve an MRF problem. As a result, the labeling vector l 1504 is obtained, which characterizes face labels.

In operation 1304, global color adjustment is performed. Here, the 3D mesh 1206, the key frames and the refined camera positions 908, and the labeling vector 1504 are used as inputs. The labeling vector 1504 defines the number of texture patches, and after operation 1304, seams between the texture patches become less noticeable.

Let f be a texture intensity function corresponding to one of RGB components. f is considered to be continuous on each texture patch and has discontinuities on boundaries between the texture patches. A goal is to find a leveling function g so that f+g will be continuous on patches and boundaries.

Each seam vertex v is split into several copies: $v_{l_1}$ is textured from $l_1$ and $v_{l_2}$ is textured from $l_2$. One for each patch contains $v_s$. The leveling function g is found in each vertex of the mesh according to Equation 4 below.

$$\sum_{\substack{v \text{ lies on seam,} \\ \text{splits into } v_{l_1}, v_{l_2}}} \left( f'_{v_{l_1}} + g_{v_{l_1}} - (f'_{v_{l_2}} + g_{v_{l_2}}) \right)^2 + \qquad \text{Equation 4}$$

$$\frac{1}{\lambda} \sum_{\substack{v_i, v_j \text{ are adjacent,} \\ \text{from the same patch}}} (g_{v_i} - g_{v_j})^2 \to \min_g$$

In Equation 4, $f_{v_{li}}'$ denotes the mean of a weighted sum of colors along seam edges containing the seam vertex v from the camera image $l_i$. In the weighted sum, the weight in the seam vertex v is 1 and linearly decreases along an edge.

In this case, an MRF problem is solved using an Eigen's conjugate gradient for each channel of RGB separately. After values of the leveling function g are computed for all mesh vertices, values between vertices are calculated using interpolation. The leveling function g is applied to corresponding fragments of camera images (key frames 908).

Figure 16:
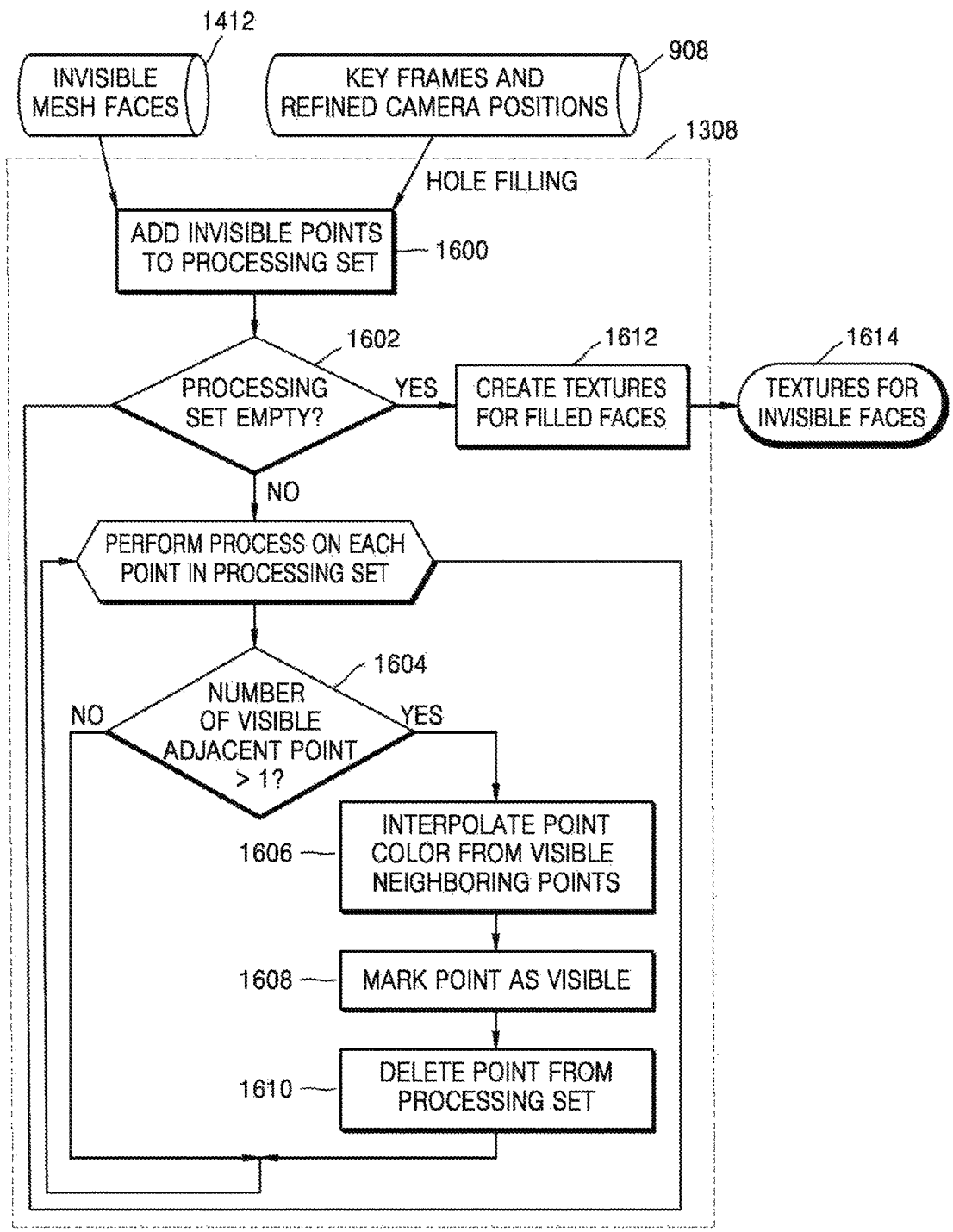
FIG. 16 is a diagram for describing hole filling according to an embodiment of the present disclosure.

FIG. 16 is a diagram for describing operation 1308, i.e., the hole filling, according to an embodiment of the present disclosure.

Referring to FIG. 16, a color is assigned to invisible points in operations 1600 through 1610 and textures for invisible mesh faces are written in operation 1612.

Invisible point colors are computed using interpolation of known point colors. A color of a point $p_{vis}$ that is visible is provided from the same camera image as for texturing a mesh face which contains $p_{vis}$. If there are several faces containing the points $p_{vis}$ that are labeled differently, either of the several faces is chosen.

In operation 1600, all invisible points (vertices of the invisible mesh faces from the list 1412) are added into a processing set.

Then, in operation 1602, an interpolation process is performed while the processing set does not become empty.

During the interpolation process, colors are computed in operation 1604 for each point p from the processing set that has more than one visible adjacent point. The color of the point p is obtained in operation 1606 by interpolating colors of all visible adjacent points. Each of RGB-channels is averaged separately. Then, the point p is marked as visible in operation 1608 and is deleted in operation 1610 from the processing set. The interpolation process is performed while the processing set does not become empty in operation 1602.

Finally, textures 1614 for invisible faces are constructed in operation 1612 from blocks of size 5×5 pixels. Here, one block is for each face.

Figure 17:
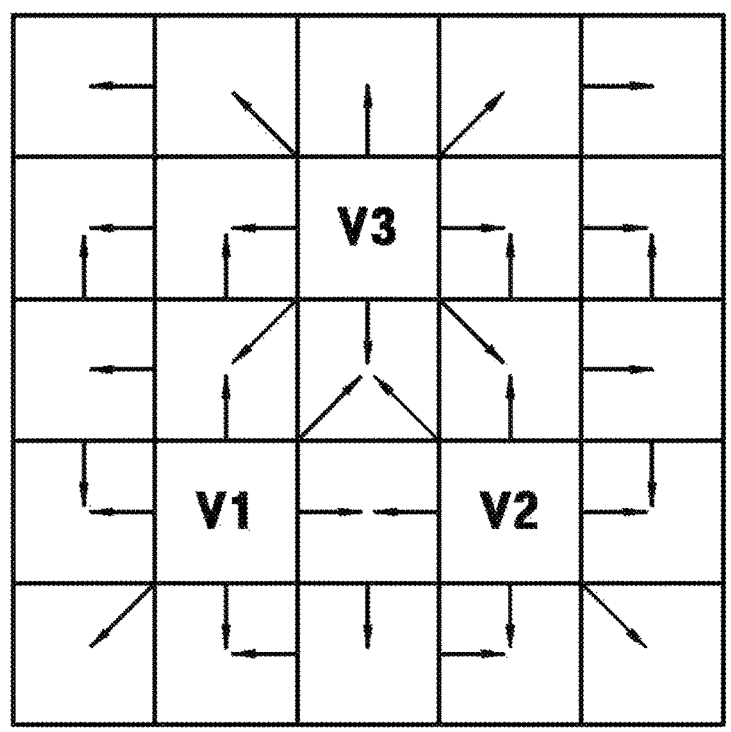
FIG. 17 is a diagram of a structure of a block according to an embodiment of the present disclosure.

FIG. 17 is a diagram of a structure of a block according to an embodiment of the present disclosure. Cells with $V_1$, $v_2$, $v_3$ have colors of face vertices which were found during the interpolation process. The colors of other cells are computed as following: the color of each cell is a mean of colors of cells from which there are arrows to this cell.

The final operation of the texture mapping process (the sub-stage 212) is operation 1310, i.e. texture atlas generation and parametrization. First, for a minimum bounding box of camera images, areas that are used for texture mapping are chosen. Then, some of the areas are scaled and combined to create, by using textures for the invisible faces from the list 1614, a texture atlas of certain size. Next, mesh parametrization is performed by calculating texture coordinates for each mesh face vertex.

Figure 18:
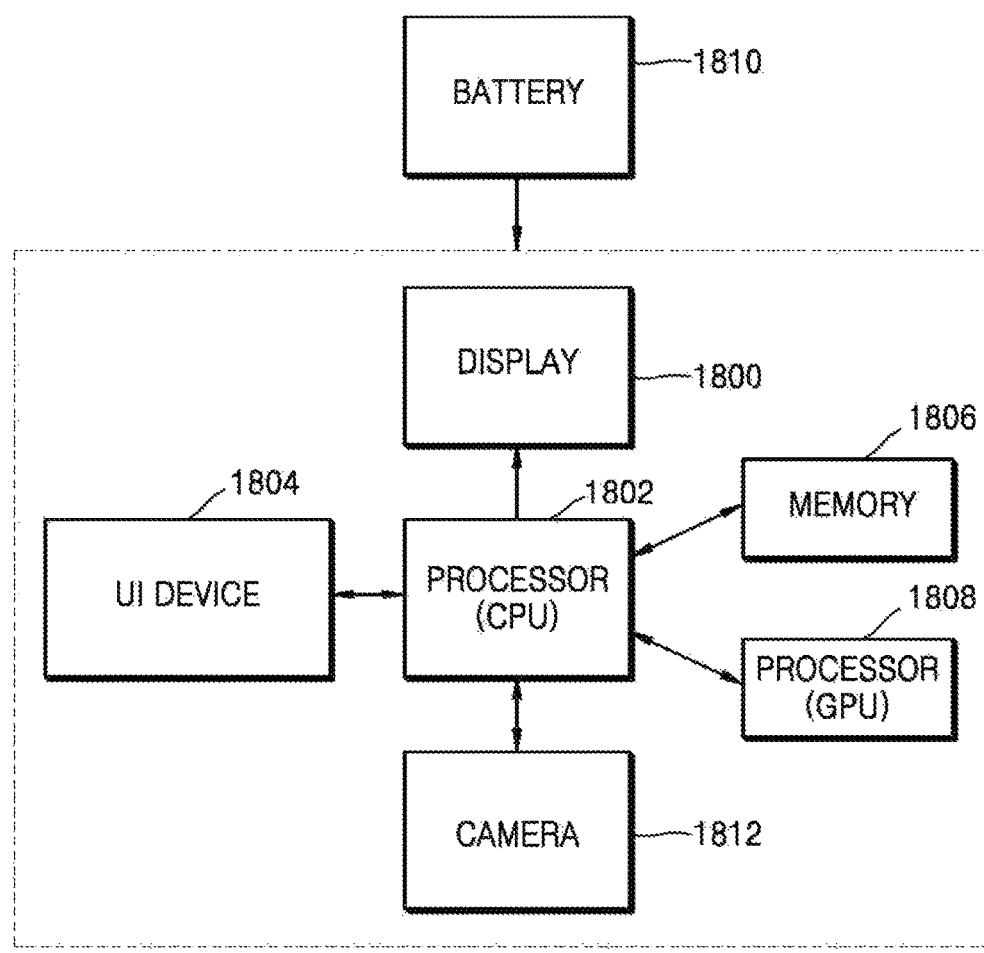
FIG. 18 is a diagram of a hardware structure of a device according to an embodiment of the present disclosure.

FIG. 18 is a diagram of a hardware structure of a device 106, according to an embodiment of the present disclosure.

Referring to FIG. 18, the device 106 includes a display 1800, a CPU 1802, one or more user interface devices 1804, a memory 1806, a GPU 1808, a battery 1810, and a camera 1812.

The CPU 1802 and the GPU 1808 execute the above-described 3D reconstruction process. The 3D reconstruction process may be executed by a low performance and power consumption processor. The 3D reconstruction process may be executed by using one processor or two or more processors.

The memory 1806 stores different software required to execute the 3D reconstruction process, which may be used by the CPU 1802 and the GPU 1808. Furthermore, the memory 1806 may also store intermediate data and final results obtained during the execution of the 3D reconstruction process. The 3D reconstruction process may be implemented by using a low memory size.

The camera 1812 (or a scanning module) is used to scan the object 102 and capture an image of the object 102.

The display 1800 is used to aid the user 100 to correctly points onto the object 102 and to display progress and final results, for example, a texturized mesh of the object 102.

The UI devices 1804, such as one or more buttons, microphones, speakers, etc., may be used to start and stop scanning and to interact with the texturized mesh of the object 102.

The battery 1810 is used to supply power to the device 106.

The hardware structure of the device 106 is not limited to that of FIG. 18. Unlike FIG. 18, the device 106 may include additional components or may not include some of the components shown in FIG. 18. For example, the device 106 may not include the UI device 1804. Also, the display 1800 may be embodied as a touch screen displaying a UI for controlling the scanning of the object 102. Here, the UI may allow the user 100 to change a scanning angle or a scanning time, or may be provided with other functions necessary for the 3D reconstruction process.

The device 106 may be connected, wirelessly or via wires, to one or more printing units, or to one or more other hand-held devices. For example, the device 106 may be connected to a printing unit that 3D-prints the texturized mesh (3D model) of the object 102. Meanwhile, the device 106 may be connected to other hand-held devices to transmit the 3D model of the object 102 to the other hand-held devices.

During the 3D reconstruction process, the user 100 may take the following actions:

1. The user 100 executes software installed in the device 106 and starts the scanning of the object 102 by using the camera 1812. Here, the user 100 may use one or more UI devices 1804. For example, the scanning of the object 102 may be activated by a user voice signal.

2. The user 100 moves along the trajectory 108 around the object 102. The software may guide the user 100 about how to move the camera 1812 around the object for a proper 3D reconstruction process with messages displayed on the display 1800.

3. The user 100 stops the scanning of the object 102 and touches a "Start reconstruction" button. Post processing including the sub-stages 204, 206, 208, 210, and 212 is executed using the CPU 1802 and the GPU 1808, while storing process results obtained during post processing in the memory 1806. As a result, the user 100 sees the texturized 3D mesh 214 (3D model) of the object 102 through the display 1800. The user 100 may rotate or scale the 3D model.

4. The user 100 may save the 3D model, transmit the 3D model to computers, or perform additional operations, such as rendering or changing textures.

According to the current embodiment of the present disclosure, a fast and user-friendly object capturing method may be provided to the user 100 since key frames to be used for the 3D reconstruction process are automatically selected. In addition, images do not need to be manually stored or transmitted to cloud since a cloud computing service is not used.

Although in the above embodiments of the present disclosure, the post processing is executed only by the device 106, but an embodiment is not limited thereto, and a cloud computing service may be used for the post processing.

Furthermore, the device 106 may transmit the images to a host PC in real-time, and camera position estimation and post processing may also be performed by the PC host.

The images captured by the camera 1812 are not only possible data used for the camera positions estimation (the sub-stage 202). For example, the device 106 may include some additional devices, such as inertial sensors, and data from such additional devices may be used for the camera position estimation in addition to the captured images.

The textured mesh is obtained as a result of the 3D reconstruction process. There may be two different modes for the 3D reconstruction process. In other words, there may be a general object model mode and a face model mode. A main difference between the two modes is a scanning behavior. In the general object model mode, 360° scanning is performed, while in the face model mode, only a face of an object is scanned at a scanning angle of 180°. However, any other forms of 3D model representation are available. For example, a dense 3D point cloud may be used for 3D reconstruction. A 3D model without textures in the form of a polygonal mesh may be represented.

Any kind of mobile devices, which has the hardware structure of FIG. 18, such as smart phones, tablets, and smart watches, may be used for the 3D reconstruction process.

3D printing may be performed based on a 3D model generated according to the 3D reconstruction process according to the current embodiment of the present disclosure.

According to the embodiments, a 3D photo may be used or shared on the Internet by storing a reconstructed 3D model of a human face.

Figure 19:
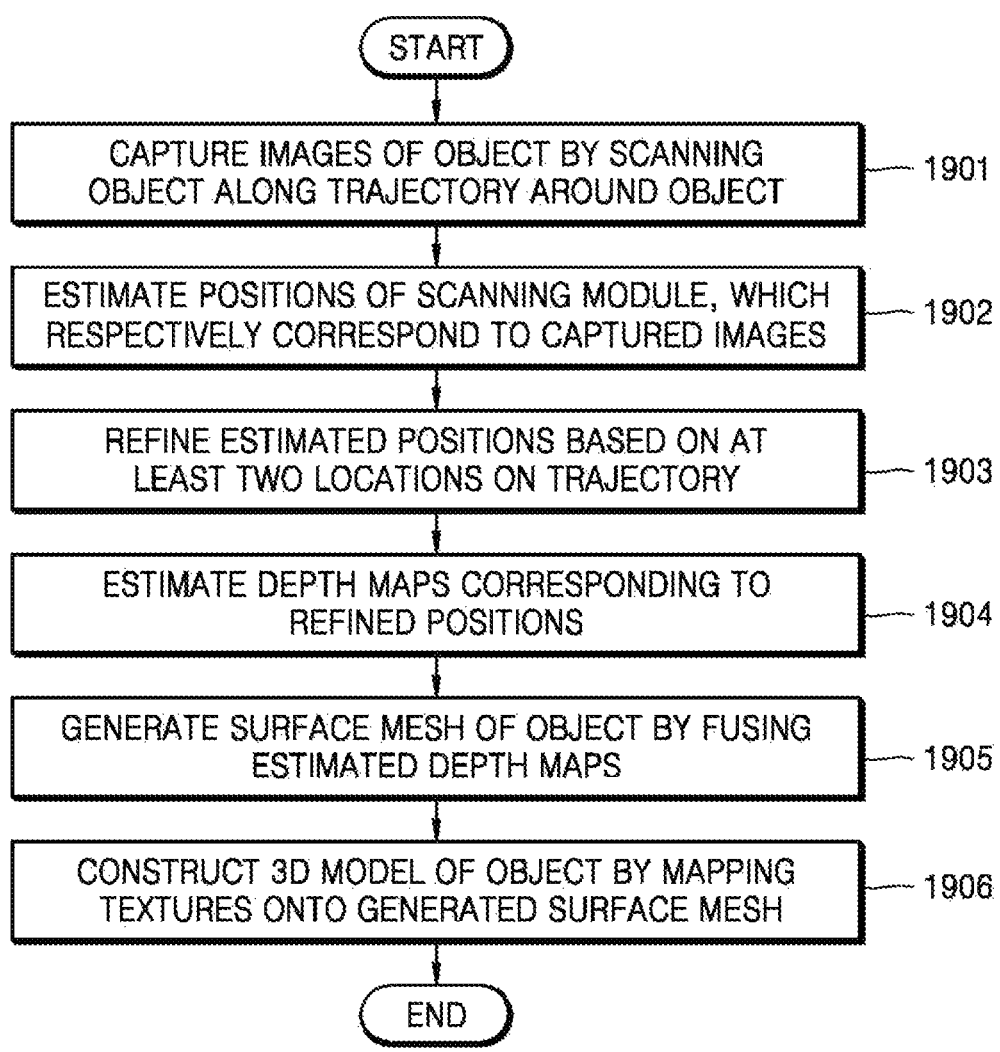
FIG. 19 is a flowchart of a method of reconstructing a 3D model of an object according to an embodiment of the present disclosure.

FIG. 19 is a flowchart of a method of reconstructing a 3D model of an object according to an embodiment of the present disclosure.

Referring to FIG. 19, the method includes the operations described above, which are performed in time-series, and thus details described above may be applied to the method of FIG. 19 even if omitted.

In operation 1901, the device 106 captures images of an object by scanning the object along a trajectory around the object.

In operation 1902, the device 106 estimates positions of a scanning module, which respectively correspond to the captured images.

In operation 1903, the device 106 refines the estimated positions based on at least two locations on the trajectory.

In operation 1904, the device 106 estimates depth maps corresponding to the refined positions.

In operation 1905, the device 106 generates a surface mesh of the object by fusing the estimated depth maps.

In operation 1906, the device 106 constructs and displays a 3D model of the object by mapping textures onto the generated surface mesh.

The embodiments may be written as computer programs and may be implemented in general-use digital computers that execute the programs using a non-transitory computer-readable recording medium. Examples of the non-transitory computer-readable recording medium include magnetic storage media (e.g., read only memory (ROM), floppy disks, hard disks, etc.), optical recording media (e.g., compact disc ROMs (CD-ROMs), or digital versatile discs (DVDs)), etc.

It should be understood that embodiments described herein should be considered in a descriptive sense only and not for purposes of limitation. Descriptions of features or aspects within each embodiment should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of constructing a three-dimensional (3D) model of an object, the method comprising:
   capturing images of the object by scanning the object along a trajectory around the object;
   estimating positions of a scanner, which respectively correspond to the captured images;
   identifying an accumulated drift of position and orientation of the scanner based on at least two locations on the trajectory;
   re-estimating the positions of the scanner by distributing the accumulated drift among the positions;
   generating a surface mesh of the object by using the re-estimated positions of the scanner; and
   constructing and displaying the 3D model of the object by using the generated surface mesh,
   wherein the re-estimating of the positions further comprises:
      identifying for each of key frames a variance indicating to what extent position is corrupted by measurement noise and the accumulated drift,
      providing key frames having a high position variance with stronger position correction, and
      providing key frames having a low position variance with less position correction.

2. The method of claim 1,
   wherein the trajectory is a closed loop or an opened loop, and
   wherein the at least two locations on the trajectory comprise start and end points of the trajectory, which correspond to loop closure points for a loop closure of the trajectory.

3. The method of claim 2, wherein the accumulated drift of the position of the scanner corresponds to a difference between a position of the start point and a position of the end point.

4. The method of claim 1, wherein the capturing of the images further comprises capturing the images by scanning the object in 360° by using a simultaneous localization and mapping (SLAM).

5. The method of claim 1, wherein the estimating of the positions of the scanner further comprises:
   performing map initialization by using a first image from among the captured images;
   extracting key points from the first image by using features from an accelerated segment test (FAST) algorithm performing corner detection; and
   estimating the positions of the scanner, which respectively correspond to the captured images by using the extracted key points.

6. The method of claim 5, wherein the estimating of the positions of the scanner further comprises:
   identifying whether each of the captured images comprises a key frame; and
   storing a captured image comprising the key frame and the corresponding position of the scanner in a memory.

7. The method of claim 6, wherein the re-estimating of the positions of the scanner further comprises:
   obtaining loop points on the trajectory with respect to the key frame;
   checking whether the loop points are loop closure points; and
   when the loop points are the loop closure points, re-estimating the positions of the scanner based on a result of performing a loop closure by using the loop closure points.

8. The method of claim 1, wherein the re-estimating of the positions of the scanner is performed to compensate for an effect of the accumulated drift generated when the object is scanned by using a simultaneous localization and mapping (SLAM).

9. The method of claim 1, wherein the generating of the surface mesh of the object comprises:
   selecting a stereo pair comprising adjacent key frames;
   estimating depth maps from the selected stereo pair by using a pyramidal approach in which a result of low resolution sampling is up-sampled via sampling of finer resolution; and
   generating the surface mesh of the object by fusing the estimated depth maps.

10. The method of claim 1, wherein the generating of the surface mesh comprises:
    estimating depth maps corresponding to the re-estimated positions of the scanner; and
    generating the surface mesh corresponding to a voxel-to-octree representation regarding the object by fusing the estimated depth maps by using 3D voxel truncated signed distance function (TSDF).

11. The method of claim 1, wherein the constructing and displaying of the 3D model further comprises:
    checking whether each face of the surface mesh is visible or invisible at each of the positions of the scanner;
    texturing a visible face of the surface mesh to a projection corresponding to one of the captured images based on a result of the checking; and
    constructing and displaying the 3D model by generating the texturized surface mesh.

12. An apparatus for configuring a three-dimensional (3D) model of an object, the apparatus comprising:
    a scanner configured to capture images of the object by scanning the object along a trajectory around the object;
    at least one processor configured to:
       estimate positions of the scanner, which respectively correspond to the captured images,
       identify an accumulated drift of position and orientation of the scanner based on at least two locations on the trajectory,
       re-estimate the positions of the scanner by distributing the accumulated drift among the positions,
       generate a surface mesh of the object by using the re-estimated positions of the scanner, and
       construct the 3D model of the object by using the generated surface mesh; and
    a display configured to display the 3D model of the object,
    wherein, to re-estimate the positions, the at least one processor is further configured to:
       identify for each of key frames a variance indicating to what extent position is corrupted by measurement noise and the accumulated drift,
       provide key frames having a high position variance with stronger position correction, and provide key frames having a low position variance with less position correction.

13. The apparatus of claim 12,
wherein the trajectory is a closed loop or an opened loop, and
wherein the at least two locations on the trajectory comprise start and end points of the trajectory, which correspond to loop closure points for a loop closure of the trajectory.

14. The apparatus of claim 13, wherein the accumulated drift of the position of the scanner corresponds to a difference between a position of the start point and a position of the end point.

15. The apparatus of claim 12, wherein the scanner is further configured to capture the images by scanning the object in 360° by using a simultaneous localization and mapping (SLAM).

16. The apparatus of claim 12, wherein the at least one processor is further configured to:
perform map initialization by using a first image from among the captured images,
extract key points from the first image by using features from an accelerated segment test (FAST) algorithm performing corner detection, and
estimate the positions of the scanner, which respectively correspond to the captured images by using the extracted key points.

17. The apparatus of claim 16, wherein the at least one processor is further configured to:
identify whether each of the captured images comprises a key frame, and
store a captured image comprising the key frame and the corresponding position of the scanner in a memory.

18. The apparatus of claim 17, wherein the at least one processor is further configured to:
obtain loop points on the trajectory with respect to the key frame,
check whether the loop points are loop closure points, and
when the loop points are the loop closure points, re-estimate the positions of the scanner based on a result of performing loop closure by using the loop closure points.

19. The apparatus of claim 12, wherein the at least one processor is further configured to re-estimate the positions of the scanner to compensate for an effect of the accumulated drift generated when the object is scanned by using a simultaneous localization and mapping (SLAM).

20. The apparatus of claim 12, wherein the at least one processor is further configured to:
select a stereo pair comprising adjacent key frames,
estimate depth maps from the selected stereo pair by using a pyramidal approach in which a result of low resolution sampling is up-sampled via sampling of finer resolution, and
generate the surface mesh of the object by fusing the estimated depth maps.

21. The apparatus of claim 12, wherein the at least one processor is further configured to:
estimate depth maps corresponding to the re-estimated positions of the scanner, and
generate the surface mesh corresponding to a voxel-to-octree representation regarding the object by fusing the estimated depth maps by using 3D voxel truncated signed distance function (TSDF).

22. The apparatus of claim 12, wherein the at least one processor is further configured to:
check whether each face of the surface mesh is visible or invisible at each of the positions of the scanner,
texture a visible face of the surface mesh to a projection corresponding to one of the captured images based on a result of the checking, and
construct the 3D model by generating the texturized surface mesh.

* * * * *